United States Patent
Chamberlain

(10) Patent No.: US 7,010,067 B2
(45) Date of Patent: Mar. 7, 2006

(54) METHODS AND APPARATUS FOR FEATURE RECOGNITION TIME SHIFT CORRELATION

(75) Inventor: Robert L. Chamberlain, Raleigh, NC (US)

(73) Assignee: Renesas Technology America, Inc., San Jose, CA (US)

(*) Notice: Subject to any disclaimer, the term of this patent is extended or adjusted under 35 U.S.C. 154(b) by 757 days.

(21) Appl. No.: 10/044,616

(22) Filed: Jan. 11, 2002

(65) Prior Publication Data

US 2002/0094042 A1 Jul. 18, 2002

Related U.S. Application Data

(60) Provisional application No. 60/261,299, filed on Jan. 12, 2001.

(51) Int. Cl.
*H03D 1/00* (2006.01)

(52) U.S. Cl. .................................................... 375/343
(58) Field of Classification Search ............... 375/343, 375/142, 143, 150, 152, 316, 340, 354
See application file for complete search history.

(56) References Cited

U.S. PATENT DOCUMENTS

| | | | | |
|---|---|---|---|---|
| 3,970,926 A | * | 7/1976 | Rigby et al. ............... | 324/621 |
| 4,964,138 A | | 10/1990 | Nease et al. ............... | 364/715 |
| 5,016,206 A | | 5/1991 | Shinonaga ................. | 364/715 |
| 5,090,024 A | | 2/1992 | Vander Mey et al. ........ | 375/1 |
| 5,239,497 A | | 8/1993 | McKay et al. ............. | 364/728 |
| 5,278,862 A | | 1/1994 | Vander May ................ | 375/1 |
| 5,555,247 A | * | 9/1996 | Matsuoka et al. .......... | 370/350 |
| 5,574,748 A | | 11/1996 | Vander Mey et al. ........ | 375/204 |
| 5,610,949 A | * | 3/1997 | Petranovich ................ | 375/330 |
| 5,748,670 A | | 5/1998 | Zastrow ..................... | 375/204 |
| 5,950,131 A | | 9/1999 | Vilmer ....................... | 455/434 |
| 5,960,028 A | | 9/1999 | Okamoto et al. ........... | 375/200 |
| 6,005,899 A | | 12/1999 | Khayrallah ................. | 375/343 |
| 6,064,695 A | * | 5/2000 | Raphaeli .................... | 375/230 |
| 6,101,213 A | | 8/2000 | Van Allen .................. | 375/130 |
| 6,144,649 A | | 11/2000 | Storm et al. ............... | 370/335 |
| 6,148,313 A | | 11/2000 | Freidin et al. .............. | 708/422 |
| 6,163,563 A | | 12/2000 | Baker et al. ............... | 375/130 |
| 6,760,393 B1 | * | 7/2004 | Alisobhani et al. ......... | 375/365 |

FOREIGN PATENT DOCUMENTS

| | | |
|---|---|---|
| EP | 0 600 710 A2 | 6/1994 |
| GB | 2 287 613 A | 9/1995 |
| WO | 01/28146 A1 | 4/2001 |

* cited by examiner

*Primary Examiner*—Kevin Burd
(74) *Attorney, Agent, or Firm*—Buchanan Ingersoll PC

(57) ABSTRACT

Methods and apparatus for feature recognition time shift correlation are presented. An exemplary method includes the step of identifying a feature in an input data stream. A starting time associated with the identified feature relative to a boundary of the input data stream is stored. A time interval until the identified feature is next repeated in the input data stream is then measured. Next, the measured time interval is compared to each of a set of valid interval values for the identified feature. A difference is then calculated between the stored starting time and a starting time associated with the identified feature relative to a boundary of a reference data sequence when the measured time interval matches one of the valid interval values. The calculated difference determines an amount that the input data stream must be time-shifted to achieve correlation with the reference data sequence.

30 Claims, 21 Drawing Sheets

Correlator Block Diagram

Zero-Crossing Detector
Block Diagram

Cycle Period Measurement Module Block Diagram

Elapsed Time Counter
Block Diagram

Clock Generator Block Diagram

Period Detector Block Diagram

Figure 16 Start Feature State Machine State Diagram

End Feature State Machine Block Diagram

End Feature State Machine State Diagram

Feature Interval State Machine Block Diagram   Figure 19

Feature Interval State Machine State Diagram

Comparator
Block Diagram

METHODS AND APPARATUS FOR FEATURE RECOGNITION TIME SHIFT CORRELATION

CROSS-RELATED APPLICATIONS

This application claims priority under 35 U.S.C. § 119 to U.S. Provisional Application No. 60/261,299, entitled "Feature Recognition Time Shift Correlator", filed on Jan. 12, 2001, the entire content of which is hereby incorporated by reference.

BACKGROUND

The present invention relates to the correlation of two signals to determine the phase relationship, or time shift, that exists between the two signals. In particular, the present invention relates to methods and apparatus for determining the phase relationship, or time shift, between two signals by means of recognizing identifiable features in the signals and measuring the time difference between occurrences of the recognized features in the two signals.

Data communication systems often require the correlation of signals. One use of correlation is to extract a signal with known characteristics from another complex, noisy signal or set of signals. Another use of correlation is to determine the phase relationship, or time shift, of one signal with respect to another signal. The techniques described below to this second application of correlation.

Specifically, the described techniques may be used to decode data transmitted in a communications system based, at least in part, on the CEBus standard, EIA-600. Unlike the EIA-600 standard, data is encoded using the techniques described below as one of 256 discrete time shifts of a specific, known pattern. To decode the transmitted data, a correlator is used to compare the received signal to the known pattern of an unshifted signal and, thus, to determine which of the 256 possible time shifts was used in transmitting the data byte. Each time shift corresponds to a unique data word.

The CEBus standard makes use of a spread spectrum communications technique known as a chirp to overcome frequency dependant characteristics of a transmission medium. A transmission medium can often exhibit very poor transmission characteristics at certain frequencies, and these frequencies with poor transmission characteristics may vary based on location and time. Transmitting information using a chirp overcomes such problems by transmitting each bit of data as a swept pattern of frequencies. Thus, even if some of the frequencies within the bandwidth of the swept pattern exhibit poor transmission characteristics, enough of the frequencies will be passed to successfully transmit the data.

FIG. 1 illustrates an exemplary chirp waveform. This chirp begins at 100 kHz and sweeps through to 400 kHz in a time period of 100 $\mu$s. The actual chirp waveform used in the CEBus standard is shown in FIG. 2. This particular chirp begins at 200 kHz, sweeps up to 400 kHz in nineteen cycles, sweeps down to 100 kHz in one cycle, and then sweeps back up to 200 kHz in five cycles. According to the CEBus standard, data information is transmitted using this chirp waveform by phase inverting (by 180 degrees) the cycles of the chirp. For example, a "one" may be transmitted by sweeping first to positive five volts, whereas a "zero" may be transmitted by sweeping first to negative five volts.

U.S. Pat. No. 6,064,695 to Raphaeli, titled "Spread Spectrum Communication System Utilizing Differential Code Shift Keying", expands on the CEBus concept by proposing the encoding of data within a chirp by shifting the start frequency of the chirp, in contrast to phase inverting the entire chirp waveform. The '695 patent proposes selecting thirty-two individual starting positions within the chirp. Two such time-shifted chirp patterns are depicted in FIGS. 3 and 4. According to the system described in the '695 patent, a received chirp can be correlated to the known pattern of an unshifted chirp pattern to determine which of the thirty-two possible shift positions was used in transmitting the chirp. The thirty-two defined time shifts allow for the encoding of five bits of data in a single bit period, in contrast to the single bit that is encoded by simple phase inversion.

Despite the data rate increase, data transmissions using this concept nevertheless suffer from unreliability as a result of impulse noise in the transmission medium that can block enough energy of any given chirp to make it impossible to correlate the received chirp to one of the unshifted patterns. To overcome this problem, the '695 patent further proposes selecting eight individual chirps with specific shift positions and combining these eight chirps into a single chirp, called a superchirp. This superchirp defines a unique, fixed pattern over a period of 800 $\mu$s.

FIG. 5 illustrates such a superchirp. The length of the superchirp pattern results in impulse noise blocking only relatively small segments of the pattern. This allows the superchirp to be correlated with the unshifted patterns using those portions of the superchirp that are received clearly. Data is encoded in the superchirp by cyclically shifting the transmission starting position within the superchirp pattern. According to the '695 patent, 256 possible starting positions are used to allow the encoding of eight bits of data over eight bit periods.

Two such time-shifted superchirps are depicted in FIGS. 6 and 7. A received superchirp can be correlated to the known pattern of an unshifted superchirp to determine which of the 256 possible shift positions was used to transmit the superchirp. FIG. 8 depicts how a received superchirp might actually appear after being transmitted though a typical transmission medium. The simulated transmission medium used for this example was designed to exhibit poor transmission characteristics at about 200 kHz. This, in turn, results in the low received signal levels shown near 200 kHz and in the regular "burst" pattern that is evident in the figure. In addition, impulse noise was added to simulated environment between 250 $\mu$s and 325 $\mu$s, and again at about 600 $\mu$s. To recover the data transmitted in this superchirp, it is necessary to correlate the received pattern with the known pattern of an unshifted superchirp. The shift pattern shown in FIG. 8 correlates to the shift pattern depicted in FIG. 6.

The conventional method of correlating such a pattern is to sample the data at regular intervals over the full length of the pattern and to store the resulting sequence of samples in a shift register. The received pattern is then repeatedly rotated in the shift register until a point of maximum correlation with one of the known patterns is determined. This conventional method is analogous to copying two patterns onto tracing paper, laying the traces one over the other on a light table, and then shifting the papers until the best possible match is achieved. It is also essentially the method of correlation that is described in the '695 patent. Using the conventional method for patterns as long as the superchirp pattern, however, has the disadvantage of requiring the use of very large shift registers and very complex correlation detectors. This, in turn, requires a large amount of logic circuitry to be employed and makes such circuitry very expensive to produce.

The techniques described below provide a simpler, more economical method of correlating patterns, as compared to those presently used to in correlation of superchirps. The described techniques provide for the correlation of patterns by first identifying certain features in a pattern, and then by searching for the position of these identified features within another pattern.

SUMMARY

It is therefore an object of the present invention to provide methods and apparatus for performing feature recognition time shift correlation.

In accordance with one aspect of the invention, the foregoing and other objects are achieved in a method of correlation in which a feature in an input data stream is identified. A starting time associated with the identified feature relative to a boundary of the input data stream is stored. A time interval until the identified feature is next repeated in the input data stream is then measured. Next, the measured time interval is compared to each of a set of valid interval values for the identified feature. A difference is then calculated between the stored starting time and a starting time associated with the identified feature relative to a boundary of a reference data sequence when the measured time interval matches one of the valid interval values. The calculated difference determines an amount that the input data stream must be time-shifted to achieve correlation with the reference data sequence. A feature may include sequences of cycle periods included in the input data stream.

According to another related aspect of the invention, positive or negative zero-crossings in the input data stream are detected. A first cycle period between consecutive positive or negative detected zero-crossings is measured. The first measured cycle period is then compared to each of a set of cycle periods associated with the input data stream. When the first measured cycle period matches one of the set of cycle periods associated with the input data stream, a second cycle period between consecutive positive or negative detected zero-crossings immediately following the first cycle period, and a third cycle period between consecutive positive or negative detected zero-crossings immediately following the second cycle period, are measured. The first, second, and third cycle periods are then compared to a set of expected cycle period sequences associated with the input data stream. A feature is identified when all periods match in sequence one of the set of expected cycle period sequences.

According to yet another related aspect of the invention, the input data stream is quantized into two levels corresponding to respective positive and negative excursions of data in the stream before detecting positive or negative zero-crossings in the stream.

According to yet another related aspect of the invention, the input data stream includes symbols of a specific length and each symbol is individually correlated to the reference data sequence. The boundary of the input data stream corresponds to the start of a symbol. Each symbol period includes a time-shifted or rotated form of the reference data sequence. Also, the reference data sequence may include subsections. Each subsection, in turn, may include a time-shifted or rotated form of the reference data sequence.

According to yet another related aspect of the invention, the identified feature and next repeated identified feature in the input data stream are located in respective adjacent subsections of the time-shifted or rotated reference data sequence that form each symbol period.

According to another aspect of the invention, transitions of cycle periods in an input data stream including a number of subsections are searched for to determine a transition time for each of the subsections. Also, a feature in the input data stream is identified. A starting time associated with the identified feature is stored, after which a first offset between the stored starting time and a nearest earlier determined transition time is calculated. A second offset between the nearest earlier determined transition time and a boundary of the input data stream is calculated, and the first offset is compared with a set of valid offset values for the identified feature to identify the subsection in which the feature is located. The second offset is then subtracted from a known offset between a transition time for the identified subsection and a boundary of a reference data sequence. The result of the subtraction determines an amount that the input data stream must be time-shifted to achieve correlation with the reference data sequence.

According to another related aspect of the invention, transitions of cycle periods are searched for by detecting positive or negative zero-crossings in the input data stream. A first cycle period between consecutive positive or negative detected zero-crossings is measured, then a second cycle period between consecutive positive or negative detected zero-crossings immediately following the first cycle period is measured. If the first cycle period and second cycle period span consecutive subsections, then a third cycle period between consecutive positive or negative detected zero-crossings immediately preceding a next expected subsection transition time and a fourth cycle period between consecutive positive or negative detected zero-crossings immediately following the third cycle period are measured. If the third cycle period and fourth cycle period span the next expected subsection, then the transition time for each of the subsections is determined based upon the next expected subsection transition time.

It should be emphasized that the terms "comprises" and "comprising", when used in this specification as well as the claims, are taken to specify the presence of stated features, steps or components; but the use of these terms does not preclude the presence or addition of one or more other features, steps, components or groups thereof.

BRIEF DESCRIPTION OF THE DRAWINGS

The above and other objects, features, and advantages of the present invention will become more apparent in light of the following detailed description in conjunction with the drawings, in which like reference numerals identify similar or identical elements, and in which.

DETAILED DESCRIPTION

Figure 1:
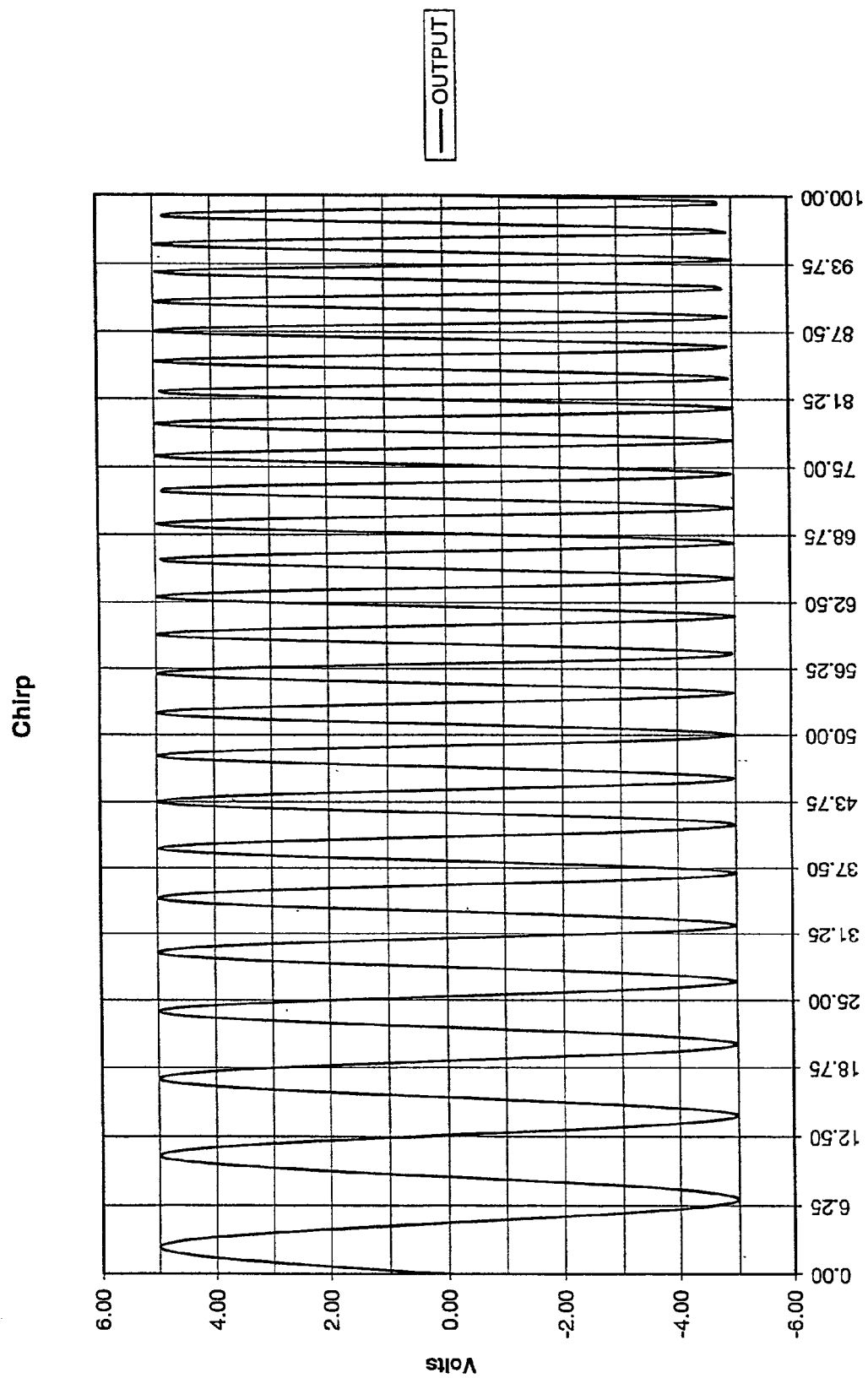
FIG. 1 is an illustration of a chirp waveform.
Figure 2:
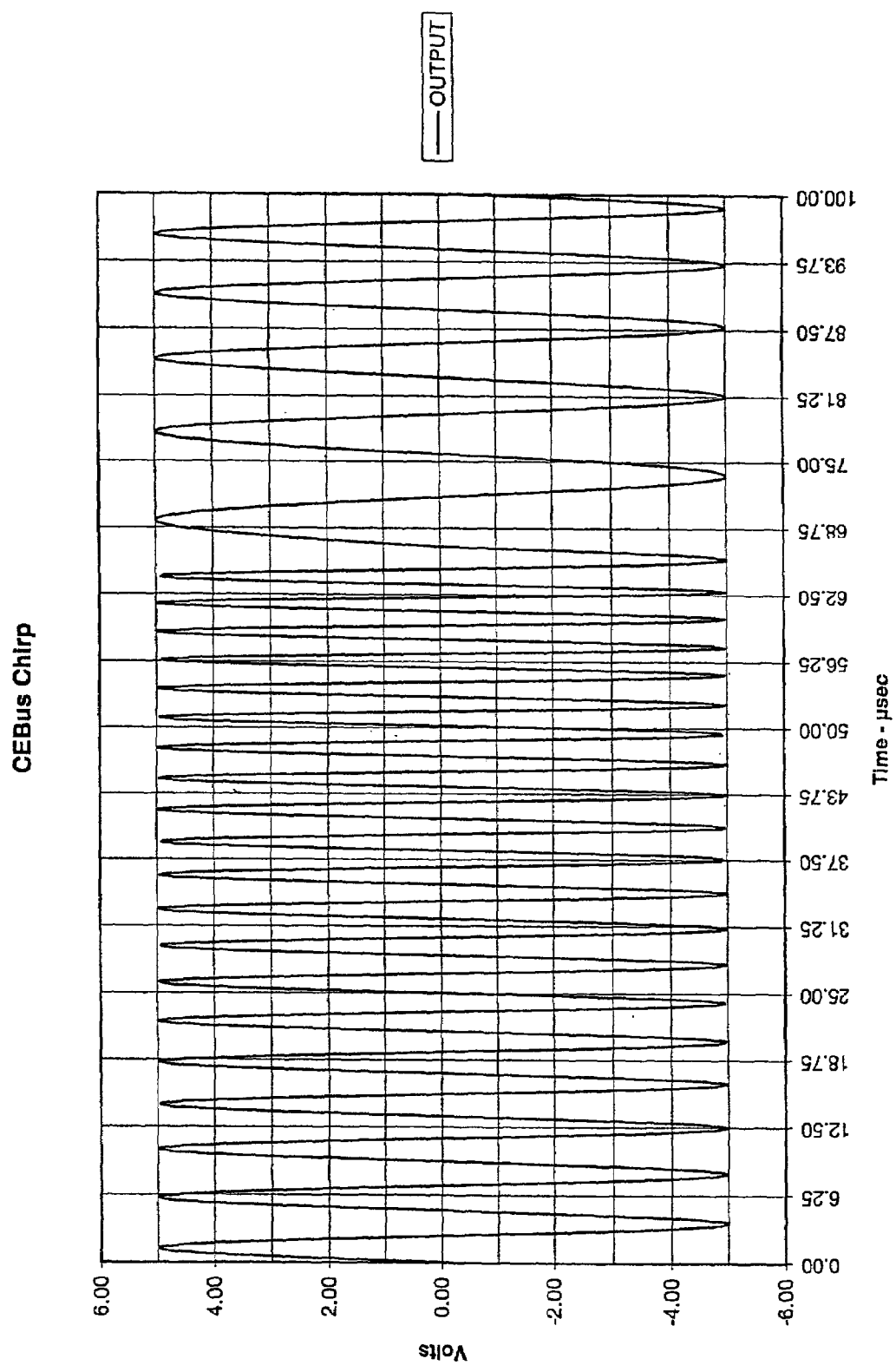
FIG. 2 is an illustration of a CEBus chirp waveform.
Figure 3:
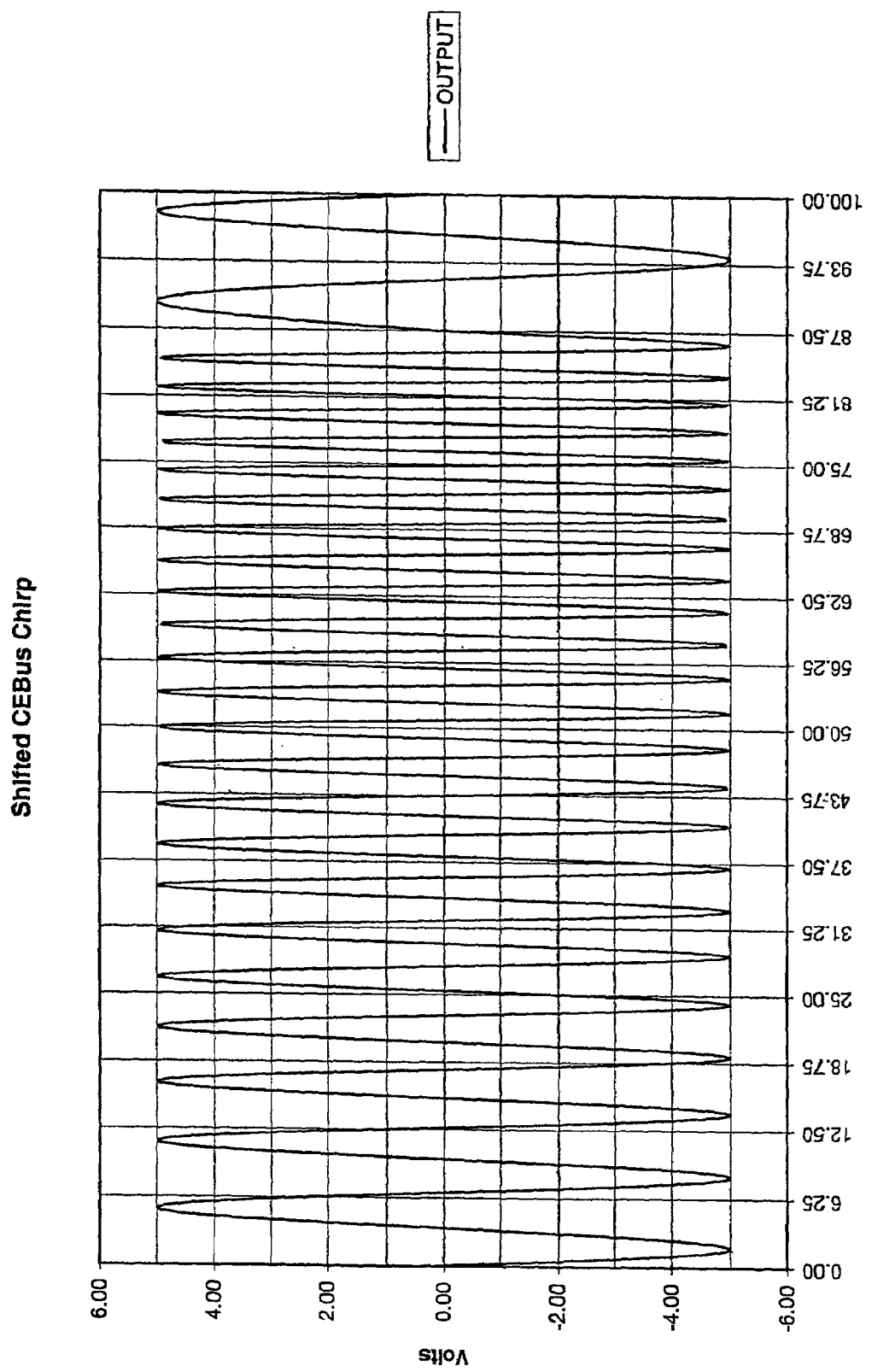
FIG. 3 is an illustration of a shifted CEBus chirp waveform.
Figure 4:
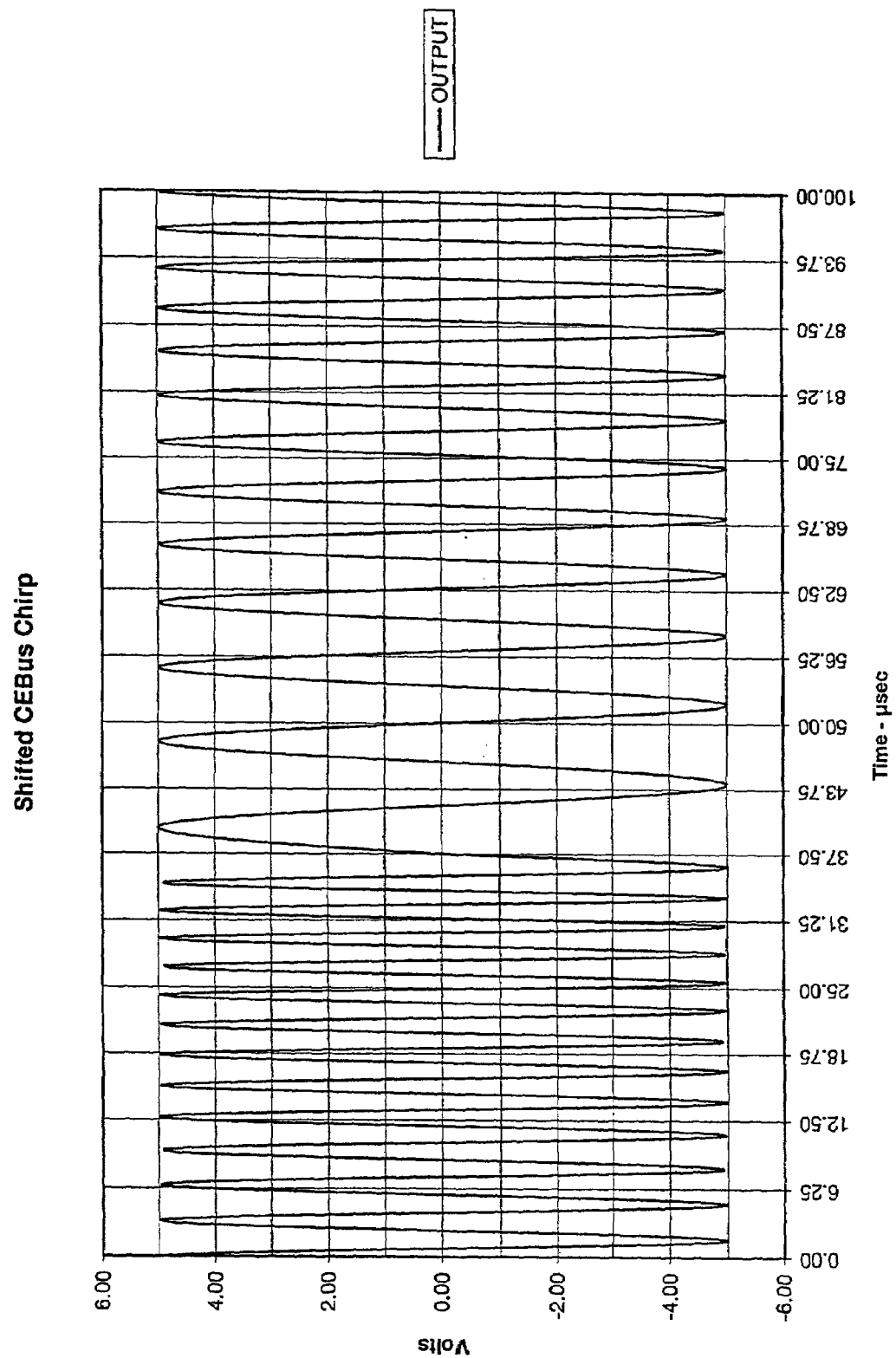
FIG. 4 is an illustration of another shifted CEBus chirp waveform.

Preferred embodiments of the present invention are described below with reference to the accompanying drawings. While these embodiments are presented using examples based on correlating data signals to the superchirp pattern described in the '695 patent, the described techniques may be used with any type of complex signal containing identifiable patterns and requiring time shift correlation. The techniques are not restricted solely to the detection of the superchirp pattern described in the '695 patent. It will also be understood that In the following description, well-known functions and/or constructions are not described in detail to avoid obscuring the invention in unnecessary detail.

As discussed above, the concept of feature recognition correlation relies on the recognition of a unique pattern within a data stream. The data stream can then be correlated to another data stream containing the same unique pattern by determining the amount by which one of the data streams must be shifted to place the identified pattern in the same position in both streams. Correlation in this manner can be done "on the fly" as one, or perhaps both, data streams are being processed, thus eliminating the need to store and correlate both complete data streams. In the case when a data stream contains errors, the accuracy of the correlation can be improved by searching for more than one unique pattern, and then requiring a proper match for all of these patterns to confirm the overall correlation.

Recall that the superchirp pattern described in the '695 patent is composed of eight simple chirps, each containing a pattern of twenty-five cycles sweeping in frequency from 100 kHz to 400 kHz. The periods of these twenty-five cycles are fixed and known. Except for the single cycle in which the frequency sweeps down from 400 kHz to 100 kHz and for the abrupt transitions at the simple chirp boundaries, the period of each of these cycles decreases from cycle to cycle according to a known algorithm. Thus, if a cycle is measured as having some specific period that fits one of the twenty-five known correct periods, the periods of the following cycles can be predicted.

If the periods of several cycles in sequence are found to match the predicted periods, it can be determined that a feature has been found within the simple chirp. This same feature will be found at different locations in several of the following simple chirps within the superchirp. Since each of the simple chirps begins with a different, known, starting point for the swept pattern, the identity of a simple chirp can be determined by measuring the location of the detected feature with respect to the start of the simple chirp pattern. The location of this identified simple chirp within the pattern of the superchirp may be used to determine the amount by which the received superchirp must be shifted to correlate to an unshifted superchirp.

Alternatively, the time interval between occurrences of the identified feature in consecutive simple chirps may be measured and then compared to the known intervals either allowed or possible for that feature. If the measured interval matches one of the possible intervals, a second, more reliable, feature will have been found. The location of the initial (or second, or both) feature within the pattern of the superchirp may then be used to determine the amount by which the received superchirp must be shifted to correlate to an unshifted superchirp. While this technique of feature recognition correlation is most preferred, either technique may be used for applying the described correlation method.

According to a first exemplary embodiment, a feature recognition correlator searches for the unique transitions of cycle periods that identify the simple chirp boundaries within the superchirp pattern. With the start positions of the simple chirps known, the correlator then searches for an identifiable pattern in the received signal and measures the placement of this pattern within a simple chirp. This placement uniquely identifies the simple chirp, the placement of which within the unshifted superchirp pattern is known. The difference between the measured offset of the simple chirp within the received superchirp pattern and the known offset of the simple chirp within the unshifted superchirp pattern determines the amount by which the received pattern must be shifted to achieve correlation with the unshifted pattern.

The input data stream may be processed using a simple comparator circuit to remove any DC component from the stream and to generate digital signal levels corresponding to the positive and negative excursions of the AC signal. The comparator output may be processed by a zero-crossing detector to detect the positive (or perhaps negative) zero-crossings of the AC signal. The time interval between the positive zero-crossings is measured and compared to the known periods of the AC cycles that may be found in the input signal. When a period match is detected, the time at which the match occurred is stored. The period of the following cycle is then compared to the known, or expected, values for this cycle that can occur on the simple chirp boundaries. When a match is found on two simple chirp boundaries in sequence, the timing of the simple chirp boundaries may be determined, and the offset between these boundaries within the received superchirp pattern may be calculated.

Next, the correlator searches for an identifiable pattern in the following simple chirps. Again, the time interval between the positive zero-crossings is measured and compared to the known periods of the AC cycles that may be found in the input signal. When a period match is detected, the time at which this match occurs, relative to the simple chirp boundary, is stored. The periods of the following two cycles are then compared to the known, or expected, values for these cycles. When all three periods match in sequence, it may be determined that a pattern or feature has been detected.

The measured offset of the feature within the simple chirp may then be compared to the eight (depending on the pattern being searched for) possible correct values for that offset. A match between the measured offset and one of these possible offsets uniquely identifies the simple chirp. The measured offset of this simple chirp boundary is subtracted from the known offset of that boundary within the unshifted superchirp pattern. The difference, truncated to eight bits, yields the value of the shift position used in transmitting the superchirp.

According to a second exemplary embodiment, the feature recognition correlator searches for an identifiable pattern, or feature, in the received signal and measures the interval until this pattern is repeated. The measured interval is then compared to known valid interval values for the identified feature. When a match is found for the measured interval, the unshifted starting position of the identified feature is determined. The difference between the measured starting position and the unshifted starting position of the identified feature determines the amount by which the received pattern must be shifted to achieve correlation with the unshifted pattern.

The input data stream may again be processed using a simple comparator circuit to remove any DC component in the signal and to generate digital signal levels corresponding to the positive and negative excursions of the AC signal. The comparator output may again be processed by a zero-crossing detector to detect the positive (or negative) zero-crossings of the AC signal. The time interval between the positive zero-crossings may be measured and then compared to the known periods of the AC cycles that may be found in the input signal. When a period match is detected, the time at which this match occurred is stored. The periods of the following two cycles are then compared to the known, or expected, values for these cycles. When all three periods match in sequence, it may again be determined that a pattern or feature has been detected.

The correlator then waits for the following simple chirp boundary to occur and then searches for a repetition of the identified feature. It is, however, not necessary to know the exact location of the chirp boundary. When the feature is again found, the interval between the first and second occurrences is measured and compared to the eight (again, depending on the pattern being searched for) possible correct interval values for that feature. A match between the measured interval and one of these eight possible intervals identifies a second, more reliable, pattern or feature. The measured starting position of the initial (or second, or perhaps both) feature is subtracted from the known starting position within the superchirp of that feature with the given measured feature interval. The difference, truncated to eight bits, yields the value of the shift position used in transmitting the superchirp.

Figure 5:
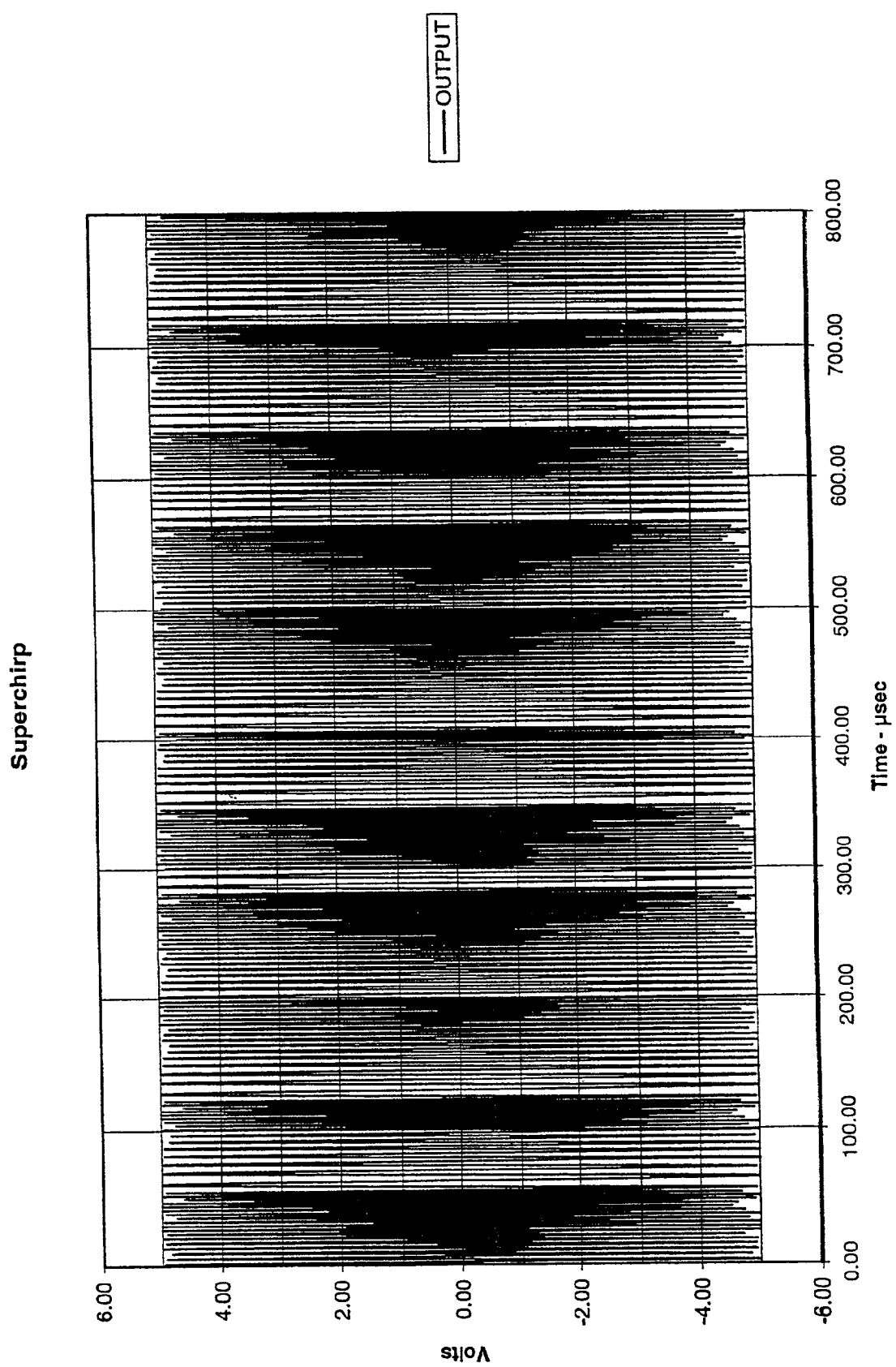
FIG. 5 is an illustration of a superchirp waveform.
Figure 6:
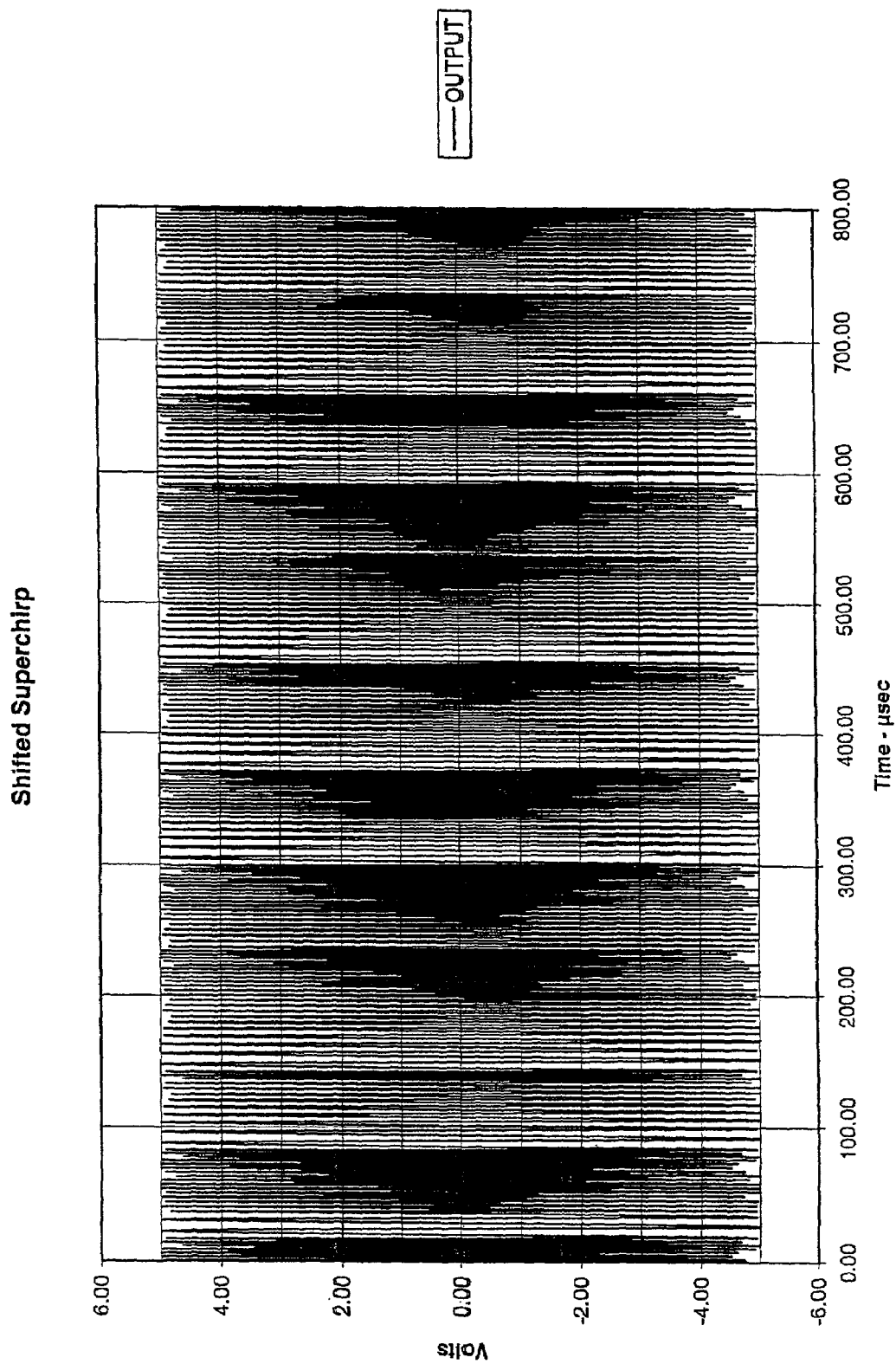
FIG. 6 is an illustration of a shifted superchirp waveform.
Figure 7:
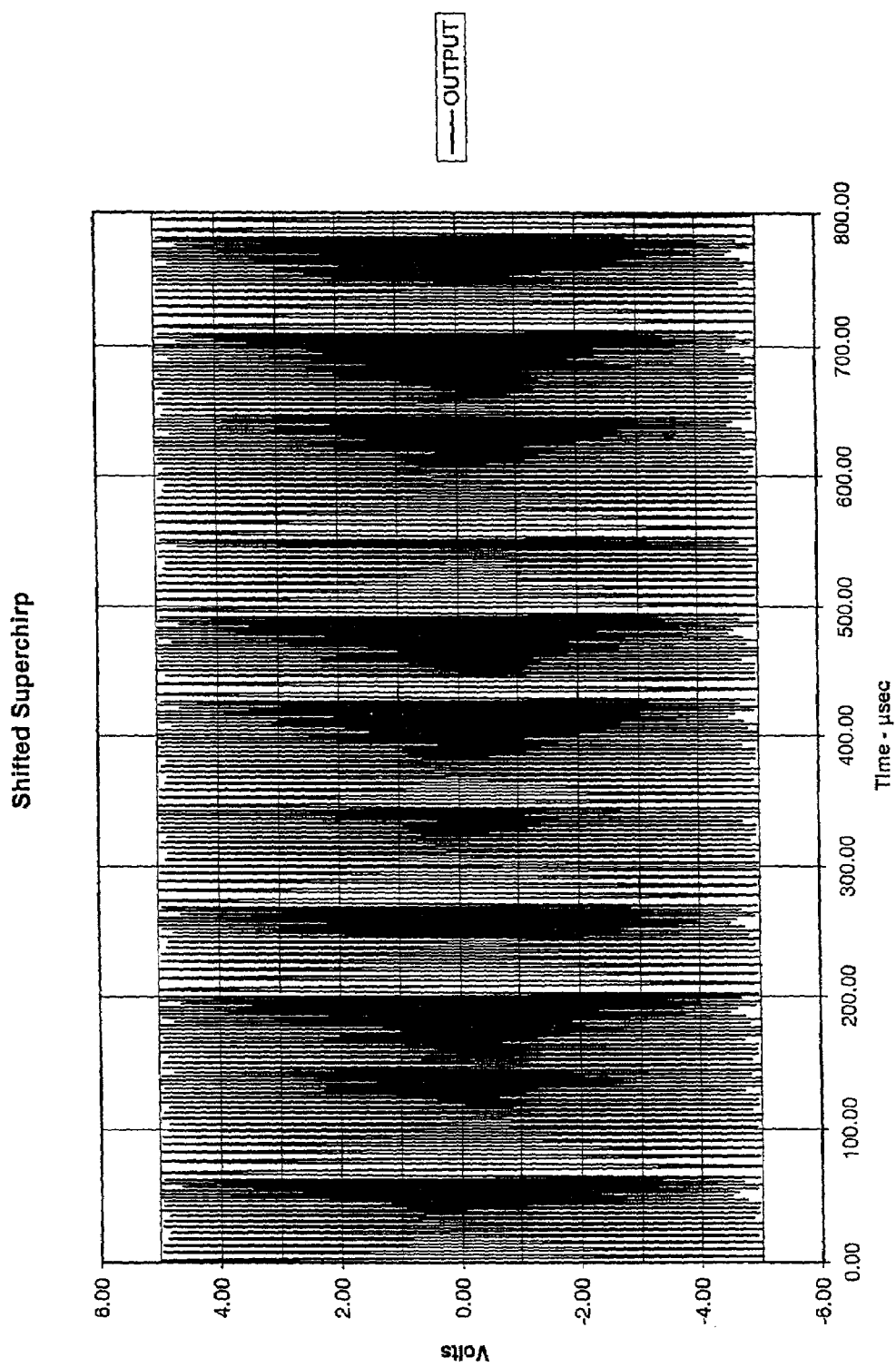
FIG. 7 is an illustration of another shifted superchirp waveform.
Figure 8:
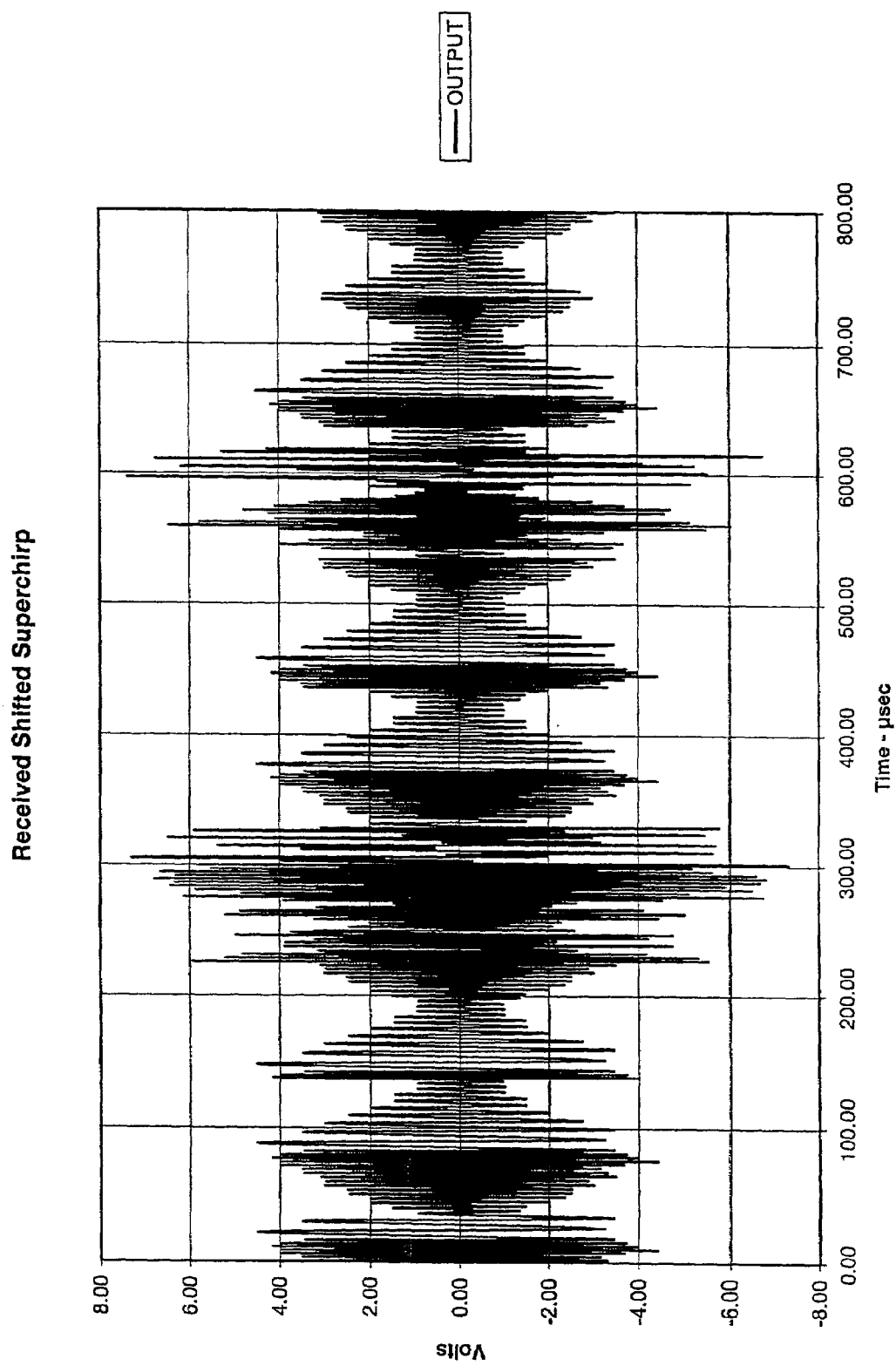
FIG. 8 is an illustration of a received, shifted superchirp waveform.
Figure 9:
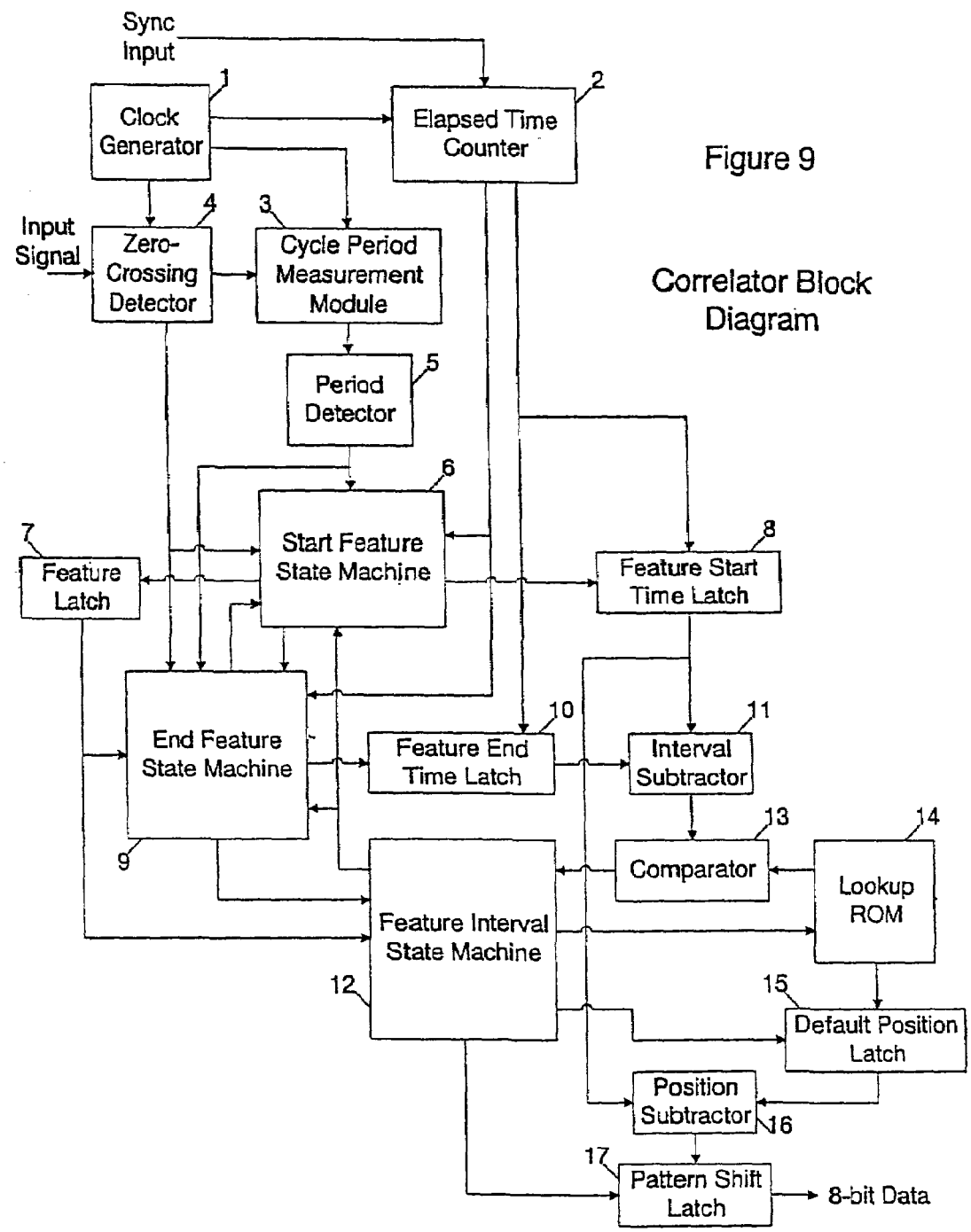
FIG. 9 is a high level block diagram of a feature recognition time shift correlator.

Circuitry for realizing the second exemplary embodiment will now be described in greater detail. A high level block diagram showing the main components of a feature recognition time shift correlator according to this second embodiment is shown in FIG. 9. The input signal to the correlator is an AC signal similar in form to the signal shown in FIG. 8. This signal may be the received form of the shifted superchirp waveform shown in FIG. 6. The time shift correlator determines the time shift between the waveform shown in FIG. 8 and the waveform shown in FIG. 5. The input data stream is made up of a series of symbols. Each symbol period contains a single superchirp waveform. This input superchirp waveform must be time-shift-correlated to the unshifted superchirp waveform within an accuracy of 3.125 $\mu$s to extract the encoded data. An elapsed time counter 2 is synchronized to the start of each symbol period and counts the elapsed time since the beginning of the superchirp within a resolution of 781.25 ns.

Figure 12:
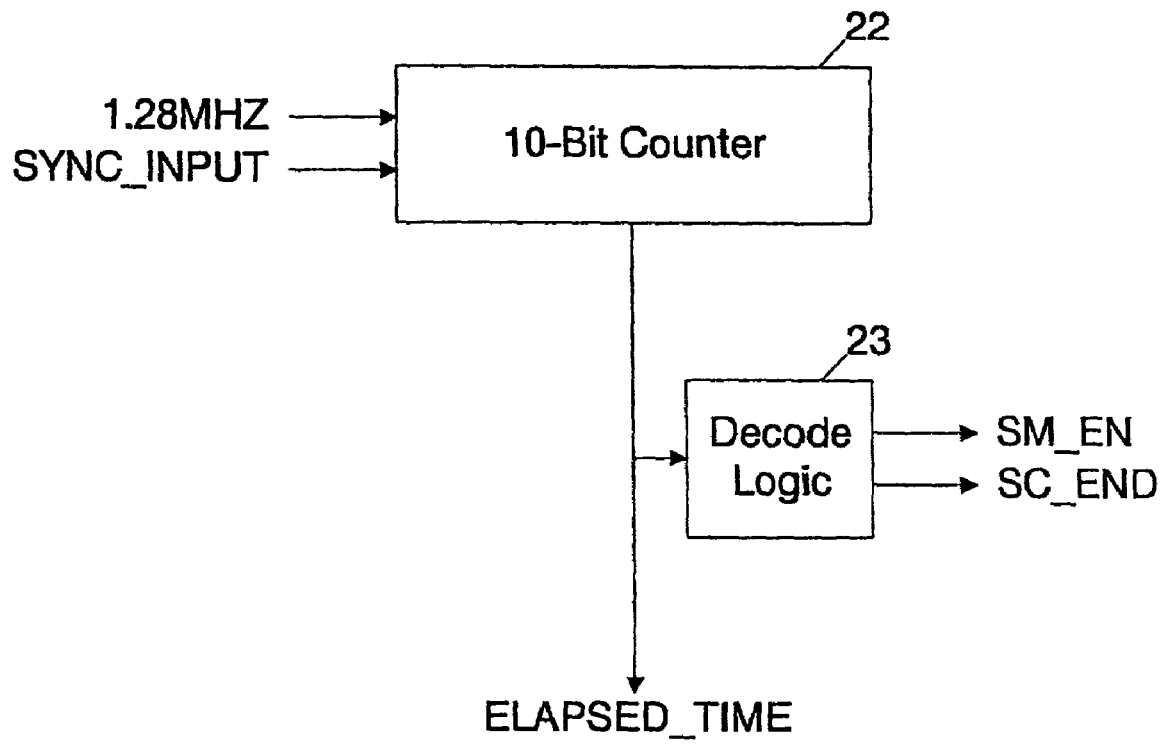
FIG. 12 is a detailed block diagram of a elapsed time counter.

A detailed block diagram of the elapsed time counter 2 is shown in FIG. 12. The counter 22 is reset by a SYNC_INPUT signal to a count of two. Thus, when the value of the counter is truncated to its eight most significant bits, the value of the counter is automatically rounded to the nearest allowed time shift step. The counter decode logic 23 provides two signals related to the superchirp timing. A first signal SM_EN is used to reset the feature recognition state machines (described below) to begin searching for features in a simple chirp. A second signal SC_END is used to indicate the end of the superchirp, and resets the correlator to begin the processing of the following superchirp.

Figure 13:
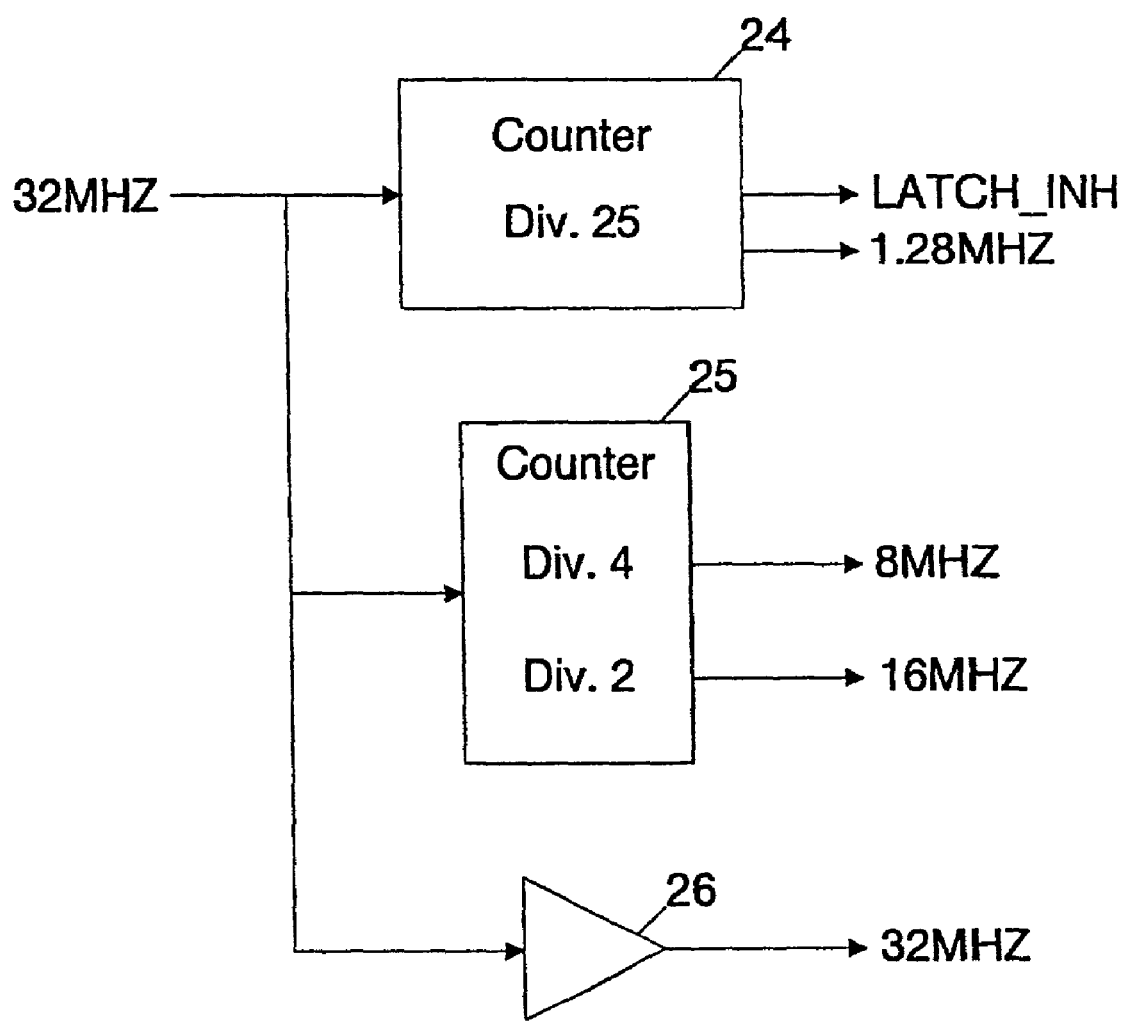
FIG. 13 is a detailed block diagram of a clock generator.

Referring again to FIG. 9, a clock generator 1 provides the basic timing signals for the correlator circuit. A detailed block diagram of the clock generator 1 is shown in FIG. 13. A first counter 24 divides a 32 MHz clock by twenty-five to provide a 1.28 MHz clock signal to the elapsed time counter 2. A signal LATCH_INH is provided to the feature recognition state machines (described below) which run asynchronously to the 1.28 MHz clock. This signal is also used to inhibit the latching of the elapsed time during periods when the elapsed time counter 2 is in transition. A second counter 25 divides the 32 MHz clock to generate synchronous 16 MHz and 8 MHz clocks for the feature recognition state machines (described below). A buffer 26 buffers the 32 MHz clock to reduce the skew to the 16 MHz and 8 MHz clocks. The buffered 32 MHz clock is provided to a zero-crossing detector 4 and a cycle period measurement module 3 that are shown in FIG. 9.

The zero-crossing detector 4 may be used to quantize the input signal to the correlator by generating a digital bit stream from the AC signal. For example, a digital "one" may be used to correspond to positive excursions of the AC signal, while a digital "zero" may be used to indicate negative excursions in the AC signal.

Figure 10:
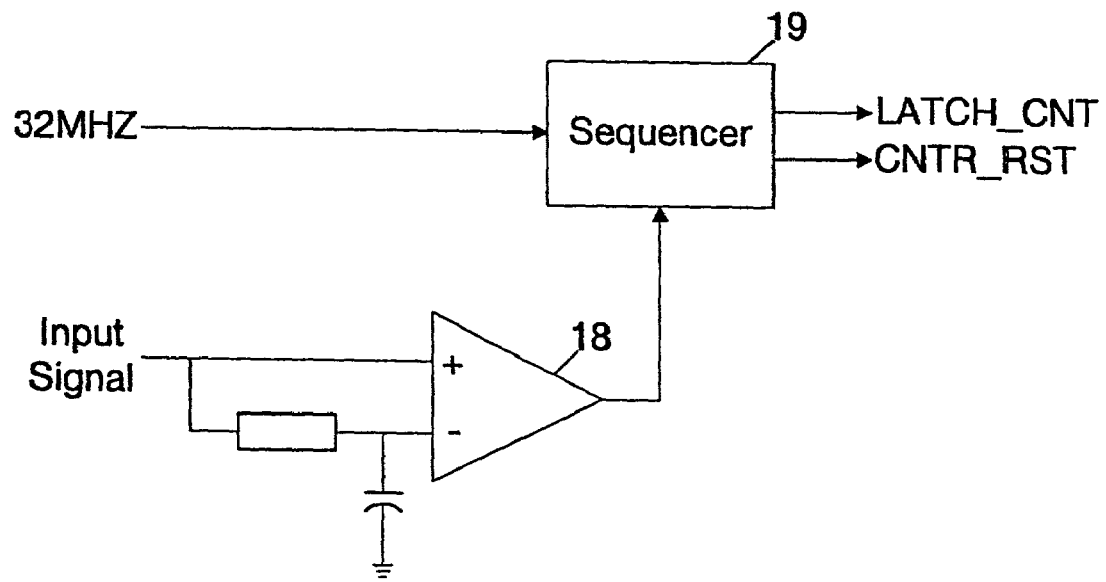
FIG. 10 is a detailed block diagram of a zero-crossing detector.

A detailed block diagram of the zero-crossing detector 4 is shown in FIG. 10. A comparator 18 performs the quantization of the input signal. A sequencer 19 is used to detect zero-to-one transitions at the comparator 18 output and to generate two signals, LATCH_CNT and CNTR_RST, in rapid sequence. These two signals are fed to the cycle period measurement module 3 of FIG. 9.

Figure 11:
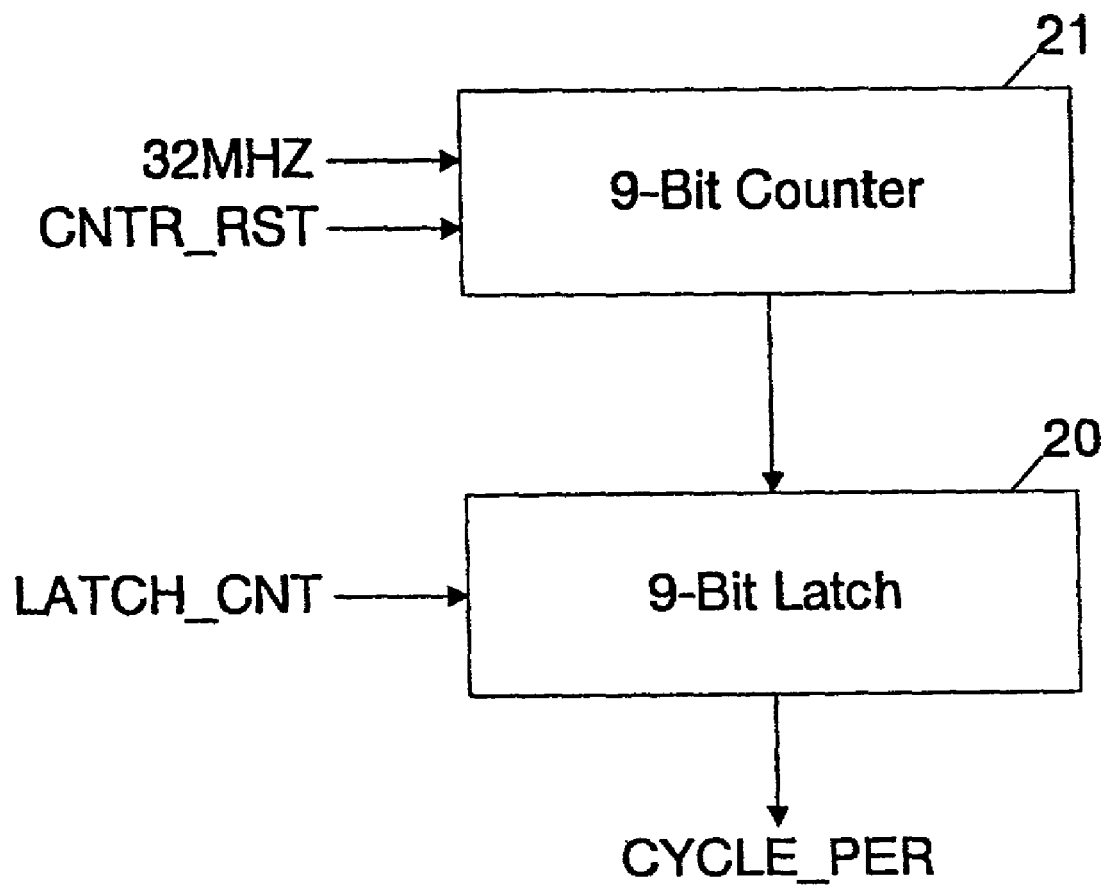
FIG. 11 is a detailed block diagram of a cycle period measurement module.

A detailed block diagram of the cycle period measurement module 3 is shown in FIG. 11. The LATCH_CNT signal is provided to cause the current state of a counter 21 to be stored in a latch 20. The CNTR_RST signal then resets the counter 21 to its zero state, causing the counter to begin recounting. The value stored in the latch 20 represents the period of one cycle of the AC input signal within a resolution of 31.25 ns (based on a 9-bit latch). The signal LATCH_CNT is also fed to the start feature state machine 6 and end feature state machine 9 shown in FIG. 9 to notify these state machines that a new cycle period is available for processing the input waveform. A period detector 5, also shown in FIG. 9, decodes the period values stored in the latch 20.

Figure 14:
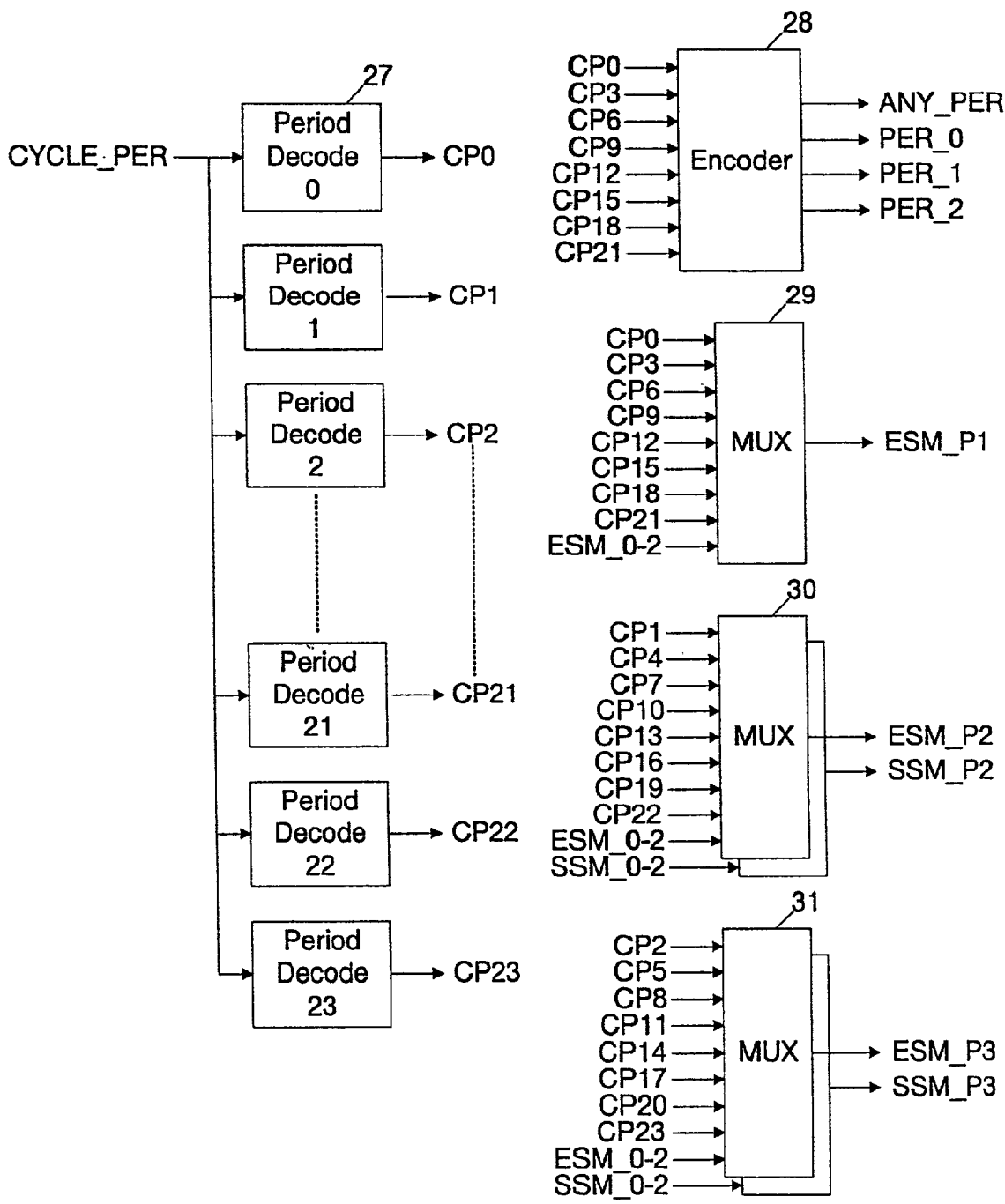
FIG. 14 is a detailed block diagram of a period detector.

A detailed block diagram of the period detector 5 is shown in FIG. 14. A number of period decode blocks 27 are preset to detect one of twenty-four possible valid cycle periods by setting respective period decode output signals CP0 through CP23. The period decode output signals CP0 through CP23 are set to true (e.g., a logical "one") when the value stored in the latch 20 of the cycle period measurement module 3 matches a value preset for a respective block, plus or minus some additional counts to allow for a tolerance of about five percent for the preset cycle periods. Typically, only a single period decode output signal will be true, but for shorter cycle periods, the allowable tolerance may cause two adjacent blocks to generate true output signals.

The output signals for every third period decode block 27, eight in total, are fed to an encoder 28. These eight detected periods are used by the start feature state machine 6 of FIG. 9 to detect the initial period of a feature. Only one of these eight signals can be true for any given count value stored in the latch 20. The encoder 28 produces signals PER_0, PER_1, and PER_2 that together form a binary encoded word that represents the one of the eight period decode signals that is set true. Another signal ANY_PER is used to indicate that one of the eight is true.

Continuing in FIG. 14, multiplexers 29, 30, and 31 allow for the selection of one particular period decode output signal. The controlling address inputs for the multiplexers ESM_0–2, SSM_0–2 are derived from the three-bit address PER_0–2 generated by the encoder 28. A first multiplexer 29 is used by the end feature state machine 9 of FIG. 9 to select the same period decode output signal used to identify the initial period in an identified feature. An output signal ESM_P1 indicates that the period decode output signal for the identified initial period is true.

Additional multiplexers 30 and 31 perform similar functions for the start feature state machine 6 and end feature state machine 9 of FIG. 9. A second multiplexer 30 has as its inputs the period decode output signals for the periods immediately following each of the initial periods connected to the encoder 28 and the first multiplexer 29. Output signals ESM_P2 and SSM_P2 are used to indicate that the period decode output signal for the second period of a feature is true. A third multiplexer 31 has as its inputs the period decode output signals for the second periods following each of the initial periods connected to the encoder 28 and the first multiplexer 29. Output signals ESM_P3 and SSM-P3 are used to indicate that the period decode output signal for the third period of a feature is true.

Operation of the correlator is further described by again referring to the high level block diagram of FIG. 9. The start feature state machine 6 shown first detects a feature in the input signal. The features that the state machine 6 detect may include valid sequences of cycle periods beginning with one of the initial cycle periods connected to the multiplexer 29, followed successively by the appropriate valid cycle periods connected to the multiplexers 30 and 31. When a feature is detected, the current count of the elapsed time counter 2 is stored in a feature start time latch 8. The stored count is the count that was valid at the time the initial period of the feature was detected.

Figure 15:
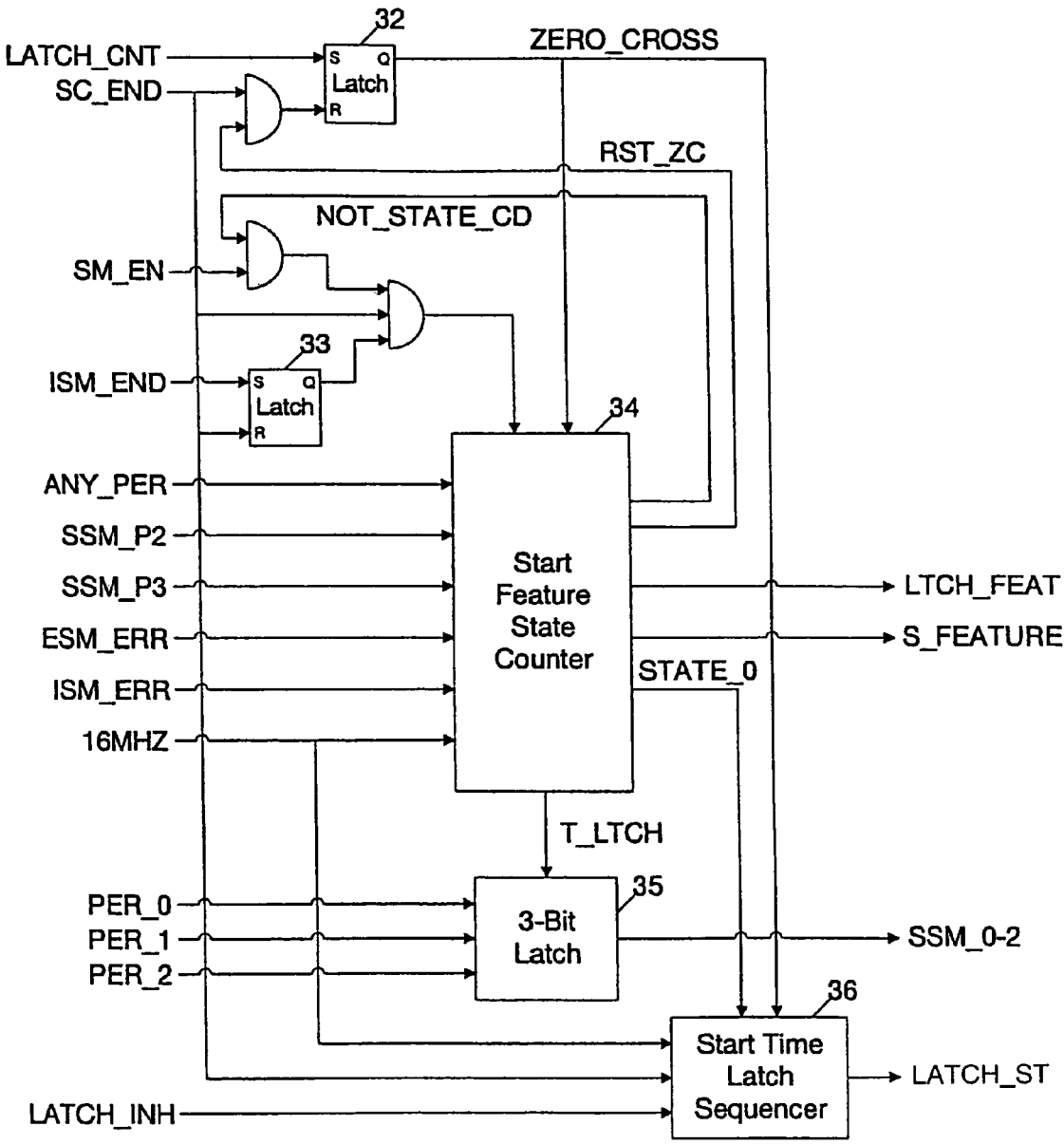
FIG. 15 is a detailed block diagram of a start feature state machine.

A detailed block diagram of the start feature state machine 6 is shown in FIG. 15. A first latch 32 is used to extend the period of the LATCH_CNT signal produced by the zero-crossing detector 4 until the signal has been recognized by the state machine 6. A signal ZERO_CROSS is produced to indicate that a cycle period is available for processing. Another internally generated signal RST_ZC is used to reset the latch 32 once the ZERO_CROSS signal has been acted upon. A second latch 33 and associated combinational logic are used to generate a reset for the state machine 6. Specifically, the signal SM_EN produced by the elapsed time counter 2 is used to reset the state machine 6 if it is not in the states C or D (shown in FIG. 16 and described in greater detail below) waiting for the end feature state machine 9 to complete its processing of a feature.

A signal ISM_END, produced by a feature interval state machine 12 shown in FIG. 9, is used to hold the state machine in the reset state once the feature interval state machine 12 has detected a valid feature interval and the correlation for the current superchirp is completed. A third latch 35 is used to store the address generated by the encoder 28. The address stored in the third latch 35 remains valid until the processing of a particular feature initial period has completed. The value stored in the third latch 35 is transferred to a feature latch 7 shown in FIG. 9 via signal lines SSM_0–2 using a transfer control signal LTCH_FEAT once a valid feature has been detected. This allows the stored address to be available to both the end feature state machine 9 and feature interval state machine 12.

A start time latch sequencer 36 is used to generate an appropriately timed latch signal LATCH_ST to the feature start time latch 8. When the ZERO_CROSS signal is true and the state machine 6 is in the state 0 (again, see the state diagram shown in FIG. 16), a latch pulse on the signal line LATCH_ST will be generated. This signal is delayed as necessary by the LATCH_INH signal to ensure that the value of the elapsed time counter 2 is stable at the time the counter value is stored. Finally, a start feature state counter 34 forms the core of the state machine 6. The state diagram for the state counter 34 is shown in FIG. 16.

Figure 16:
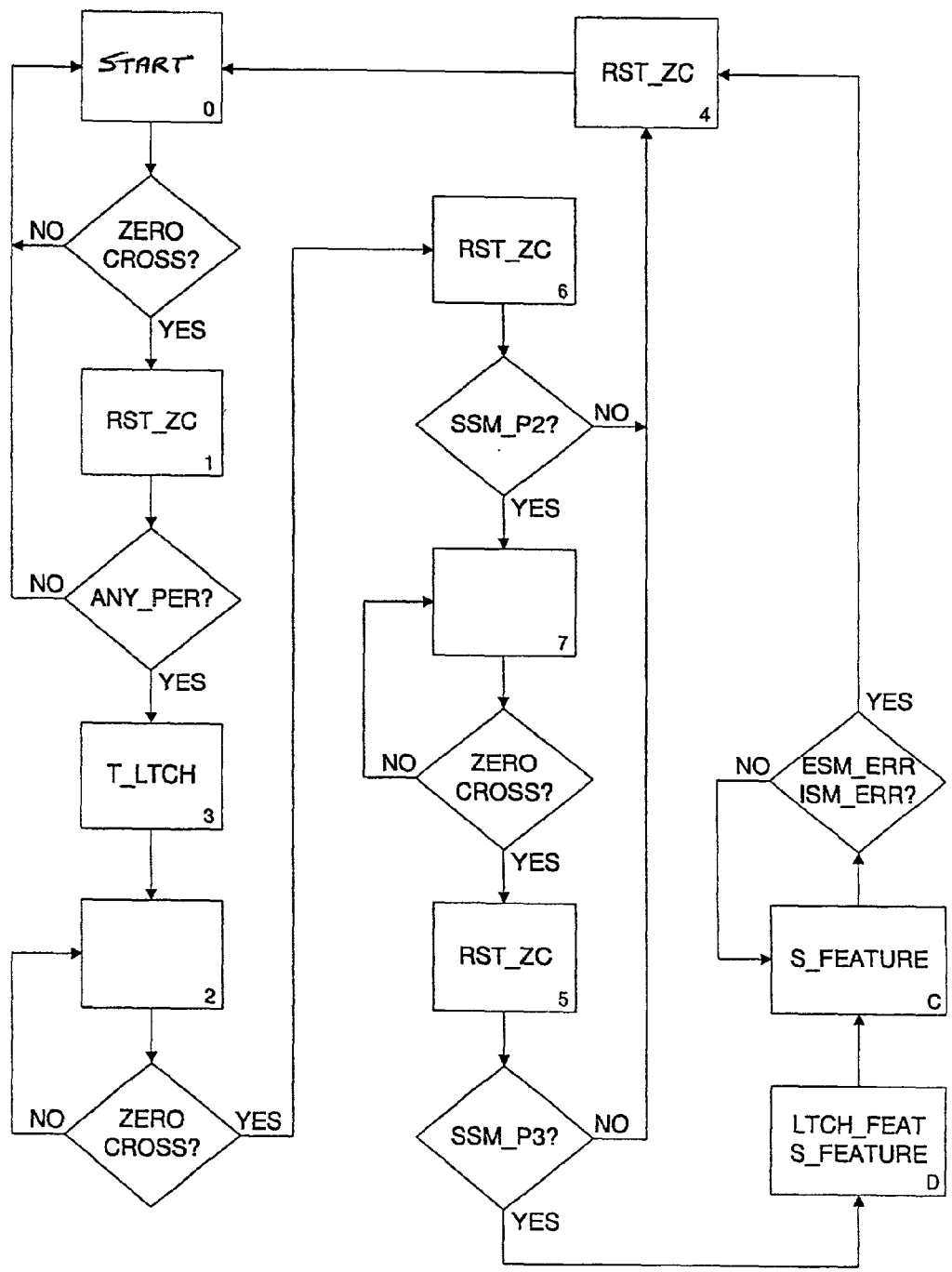
FIG. 16 is a state diagram for the start feature state machine.

Referring now to FIG. 16, the state diagram for the state counter 34 begins at state 0. When the ZERO_CROSS signal transitions to true, the state counter enters state 1. In this state, the first latch 32 is reset and the signal ANY_PER is examined to determine if one of the eight defined feature initial cycle periods is true. If so, the address for that period is stored in the second latch 35 by setting the T_LTCH signal at state 3, and the state counter then waits for the following cycle at state 2. When the ZERO_CROSS signal next transitions to a true level, the first latch 32 is again reset at state 6, and the signal SSM_P2 is examined to see if the current cycle period is equal to a valid second period associated with the initial cycle period. If so, the state counter again waits for the following cycle at state 7. When the ZERO_CROSS signal again transitions to a true level, the first latch is again reset at state 5, and the signal SSM_P3 is examined to determine if the current cycle period is equal to a valid third period associated with the initial cycle period. If so, the state counter 34 enters state D and a signal LTCH_FEAT is pulsed to transfer the value stored in the second latch 35 to the feature latch 7. The state machine then enters state C where another signal S_FEATURE is set to true to indicate to the end feature state machine 9 that it should begin looking for the same feature in the following simple chirp.

The state counter 34 remains in state C with the S_FEATURE signal set to true until either the end feature state machine 9 indicates, by way of the signal ESM_ERR, its failure to find the feature in the following simple chirp, or the feature interval state machine 12 indicates, by way of the signal ISM_ERR, that the interval between feature occurrences is not valid. If either of these events occur, the state counter 34 enters state 4 where the first latch 32 is again reset using the RST_ZC signal, after which the counter re-enters state 0 to begin searching for a new feature. If any of the signals ANY_PER, SSM_P2, or SSM_P3 are not valid at the times they are examined, the state counter again resets the first latch 32 at state 4, and re-enters state 0 to begin searching for a new feature.

Like the start feature state machine 6 just described, the end feature state machine 9 of FIG. 9 is also used to detect a feature in the input signal. The features that the end state machine 9 detects may include valid sequences of cycle periods beginning with the initial cycle period of a feature identified by the start feature state machine 6, followed successively by appropriate valid cycle periods detected by the multiplexers 30 and 31 of the period detector 5. When a feature is detected, the current count of the elapsed time counter 2 is stored in a feature end time latch 10. The stored count is the count that was valid at the time the initial period of the feature was detected.

Figure 17:
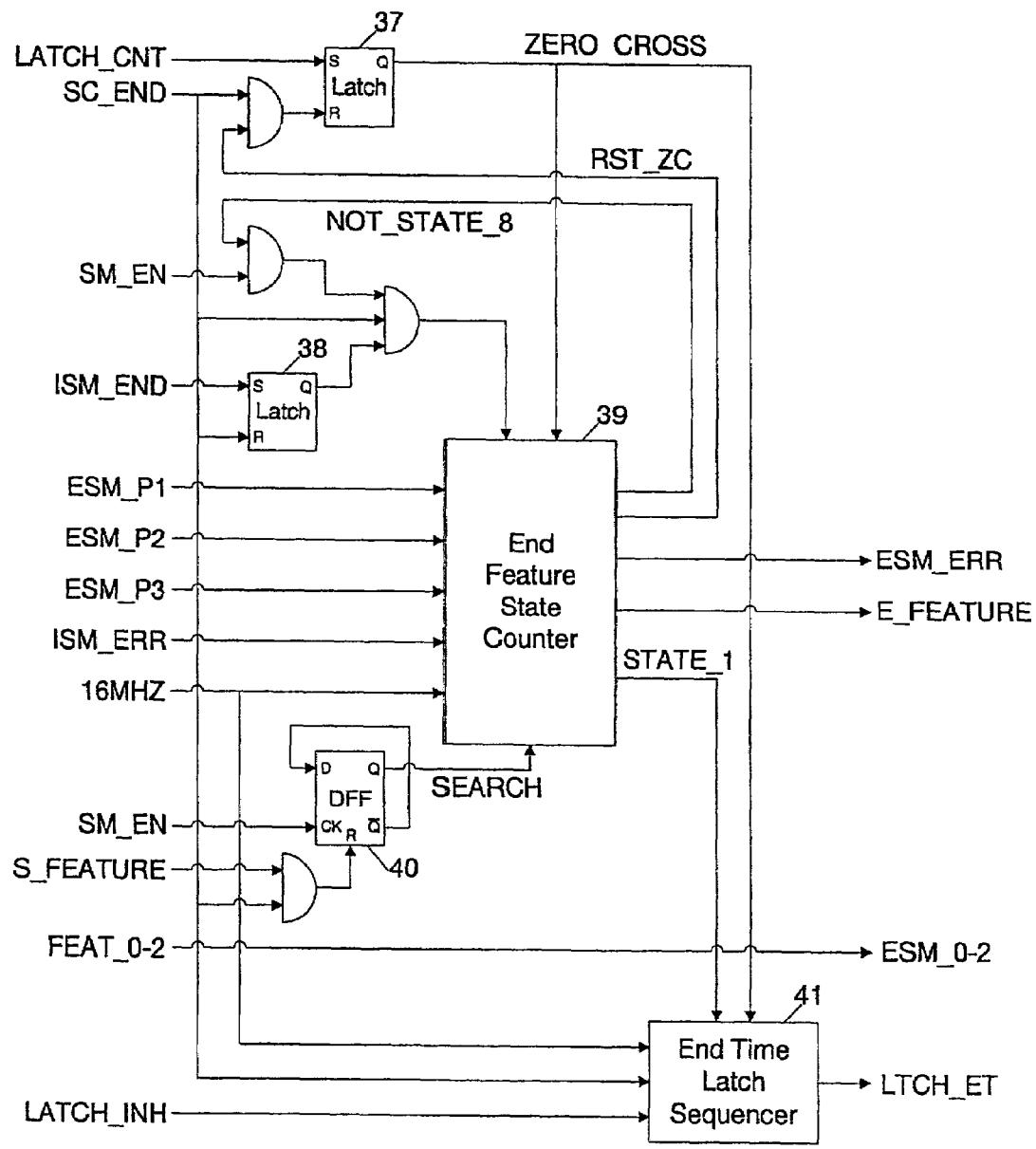
FIG. 17 is a detailed block diagram of an end feature state machine.

A detailed block diagram of the end feature state machine 9 is shown in FIG. 17. A first latch 37 is used to extend the period of the LATCH_CNT signal until the signal has been recognized by the state machine 9. A signal ZERO_CROSS indicates that a cycle period is available for processing. Another signal RST_ZC is used to reset the first latch 37 once the ZERO_CROSS signal has been acted upon. A second latch 38 and associated combinational logic are used to generate a reset for the state machine 9. Specifically, the signal SM_EN is used to reset the state machine 9 if it is not in state 8 (see the associated state diagram shown in FIG. 18 and described below) waiting for the feature interval state machine 12 to complete processing of a feature. Another signal ISM_END is used to hold the state machine in a reset state once the feature interval state machine 12 has detected a valid feature interval and the correlation for the current superchirp is completed.

Continuing with FIG. 17, a "D" type flip-flop 40 is used to delay the S_FEATURE signal provided by the start feature state machine 6 until the start of the simple chirp period following the simple chirp period in which the start feature was detected. The flip-flop 40 is reset each time the signal S_FEATURE is set false, and generates a signal SEARCH that does not transition to true until the following simple chip period has begun. The value previously transferred to the feature latch 7 by the start feature state machine 6 is present on the signals FEAT_0–2. These signals also serve as the multiplexer address signals ESM_0–2 used by multiplexers 29, 30, and 31 in the period detector 5.

An end time latch sequencer 41 is used to generate an appropriately timed latch signal to the feature end time latch 10. When the ZERO_CROSS signal is true and the state machine is in state 1 (see the associated state diagram shown in FIG. 18), a latch pulse will be generated, delayed as necessary by the LATCH_INH signal to ensure that the value of the elapsed time counter 2 is stable at the time the counter value is stored. Finally, an end feature state counter 39 forms the core of the state machine 9, controlling its operation. The state diagram for the state counter 39 is shown in FIG. 18.

Figure 18:
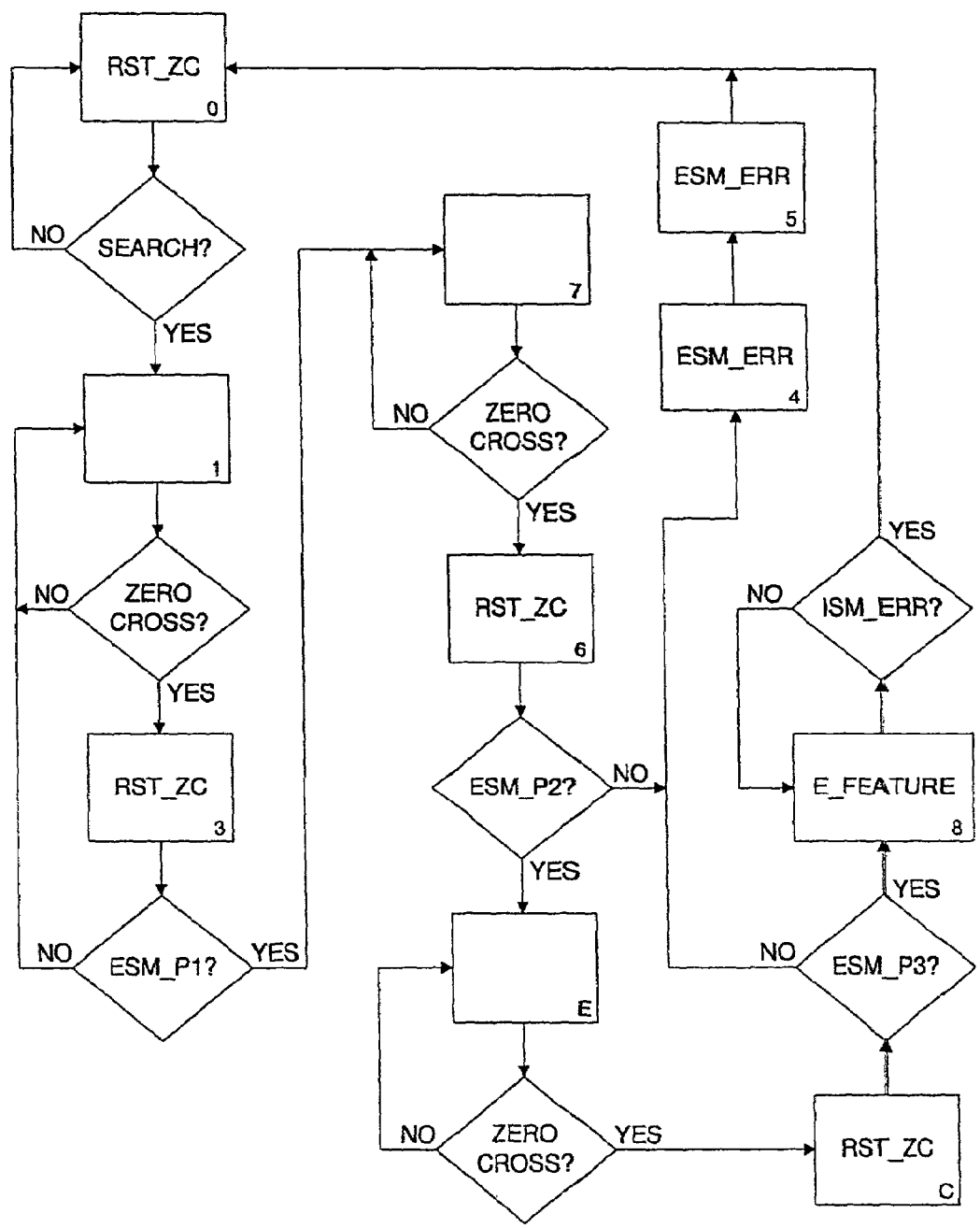
FIG. 18 is a state diagram for the end feature state machine.

Referring now to FIG. 18, the state diagram for the state counter 39 begins at state 0 with a resetting of the first latch 37. When the signal SEARCH transitions to true, the state machine enters state 1 and begins searching for the initial period of the feature detected by the start feature state machine 6. When the ZERO_CROSS signal transitions to a true value, the state counter enters state 3 where the first latch 37 is again reset and the signal ESM_P1 is examined to determine if the current cycle period is the correct initial period. If so, the state counter waits for the following cycle at state 7. When the ZERO_CROSS signal next transitions to a true value, the first latch 37 is again reset at state 6 and the signal ESM_P2 is examined to determine if the current cycle period is equal to a valid second period associated with the initial cycle period. If so, the state counter again waits for the following cycle at state E. When the ZER_CROSS signal again transitions to a true value, the first latch 37 is again reset at state C and the signal ESM_P3 is examined to determine if the current cycle period is equal to a valid third period associated with the initial cycle period. If so, the signal E_FEATURE is set to true at state 8 to indicate to the feature interval state machine 12 that the measured interval between the occurrences of the identified feature should be validated.

The state counter 39 remains in state 8 with the E-FEATURE signal set true until the feature interval state machine 12 indicates, by means of the signal ISM_ERR, that the interval between feature occurrences is not valid. In this case, the state counter reenters state 0 and waits for a new feature to be identified by the start feature state machine 6. If either of the signals ESM_P2 or ESM_P3 are not valid at the times they are examined, the state counter sets the signal ESM_ERR true for two cycles to indicate to the start feature state machine 6 that it should begin looking for a new feature. The state counter then re-enters state 0 and waits for a new feature to be found.

An interval subtractor 11, shown in FIG. 9, provides a time difference between the values stored in the feature start time latch 8 and the feature end time latch 10. The value stored in the start time latch is guaranteed to be smaller than the value stored in the end time latch. The subtractor 11 provides the one's compliment of the start time to a 10-bit full adder with its carry zero input set to true. This effectively subtracts the start time from the end time. Since the difference between the start and end times can never exceed 200 μs (based on the characteristics of the superchirp waveform) only the lower eight bits of the difference value are used. These bits represent the measured interval between the occurrence of the feature identified by the start feature state machine 6 and the occurrence of the same feature in the following simple chirp period, within a resolution of 781.25 ns. Other arrangements may of course be used when correlating to different encoding patterns.

Figure 19:
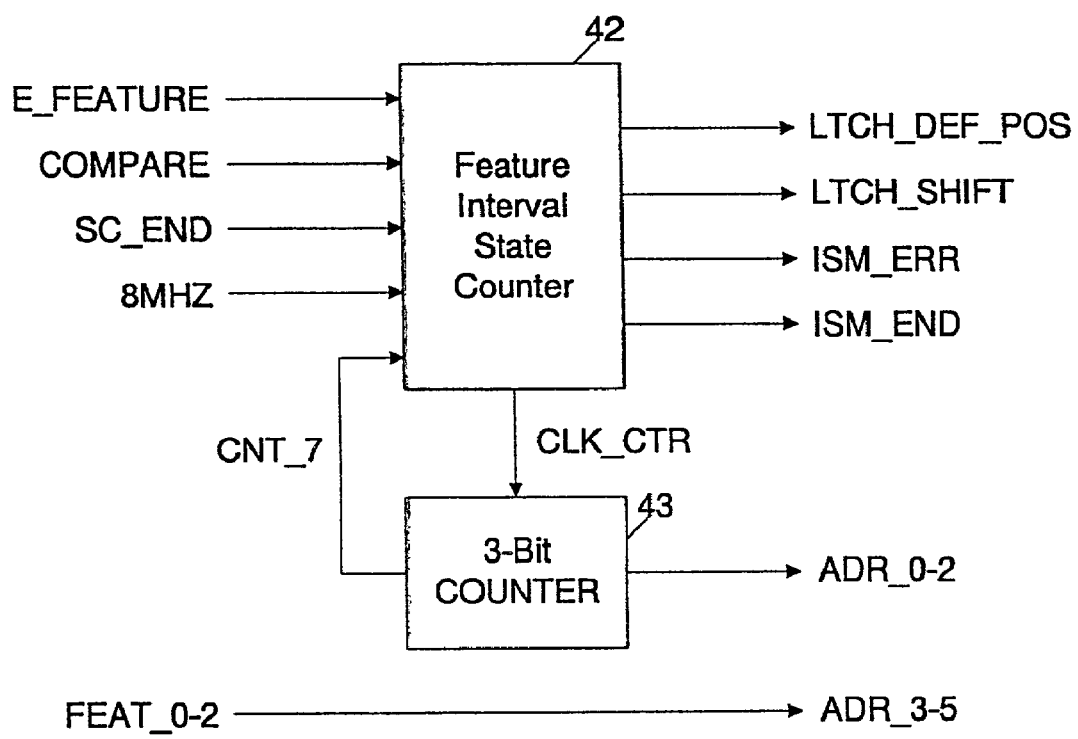
FIG. 19 is a detailed block diagram of a feature interval state machine.

Once calculated by the subtractor 11, the feature interval is then validated by the feature interval state machine 12. The state machine 12 validates the interval by comparing it to the eight (of course, a different number may be present with other encoding patterns) intervals that are valid for the identified feature. A detailed block diagram of the state machine is shown in FIG. 19. A central feature of the state machine 12 is its feature interval state counter 42. The state diagram for this state counter is shown in FIG. 20.

Figure 20:
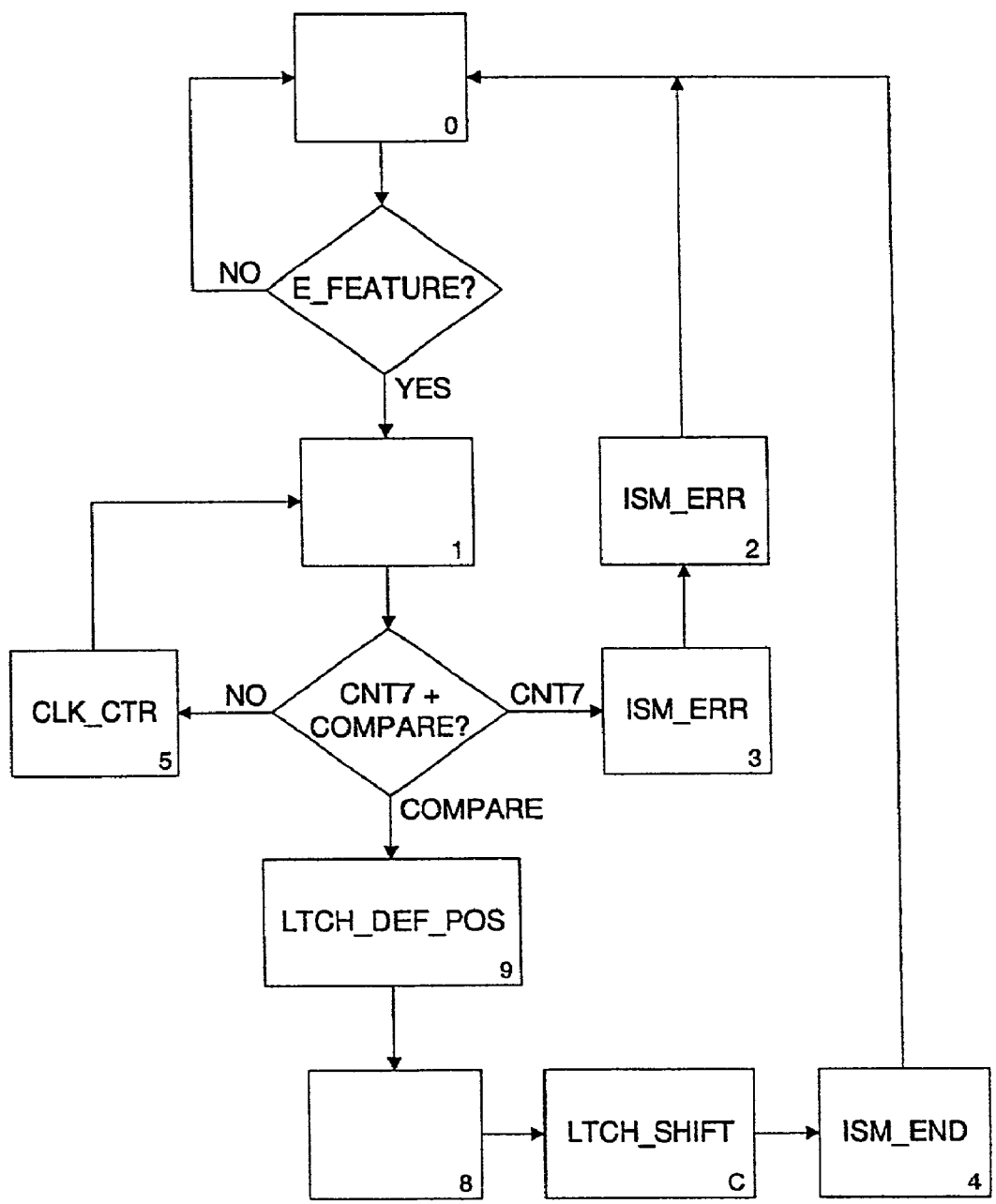
FIG. 20 is a state diagram for the feature interval state machine.

Referring now to FIG. 20, the state diagram for the state counter 42 begins at state 0. When the signal E_FEATURE transitions to a true value, indicating that a measured feature interval is present at the outputs of the interval subtractor 11, the state counter enters state 1 and begins testing this interval for validity. The values of the eight valid feature intervals are stored, e.g., in a lookup read-only memory (ROM) 14. The three most significant address bits for this ROM are provided by the signals FEAT_0–2, which are provided by the feature latch 7. The three least significant bits of the address are provided by a counter 43 of the feature interval state machine 12.

Initially, the counter 43 is reset to zero. If the interval value stored in the ROM location associated with count 0 for the identified feature does not match the measured interval, the state counter enters state 5, where the counter 43 is incremented. The state counter then re-enters state 1, where the next possible valid interval is checked. This process continues until the counter 43 reaches the count of seven. If the counter 43 reaches the count of seven and the measured interval still does not match, the state counter enters state 3 followed by state 2 causing the signal ISM_ERR to be set to true for two cycles. This signal is used to indicate to the start feature state machine 6 and to the end feature state machine 9 that both state machines should begin searching for a new feature.

If the measured interval is found to match one of the interval values stored in the lookup ROM 14, the state counter 42 sets a signal LTCH_DEF_POS to true in order to latch a second value stored in the lookup ROM 14 into a default position latch 15 shown in FIG. 9. This second value is a 9-bit value representing the known starting position of the identified feature within the unshifted superchirp pattern. The stored value represent the default position of the identified feature to within a resolution of 3.125 $\mu$s. The state counter next delays through state 8 to allow a position subtractor 16 (described below) to function before entering state C where the signal LTCH_SHIFT is pulsed to true. This operation latches the output value of the position subtractor 16 into the pattern shift latch 17.

At this point, the input superchirp now has been correlated to the unshifted superchirp, and the value stored in the pattern shift latch 17 represents the time shift of the input superchirp within a resolution of 3.125 $\mu$s. Following this, the state counter 42 next enters state 4, where the signal ISM_END is pulsed to true in order to hold the start feature state machine 6 and the end feature state machine 9 in reset until a new superchirp is received. The state counter re-enters state 0 to wait for a new interval to validate.

Figure 21:
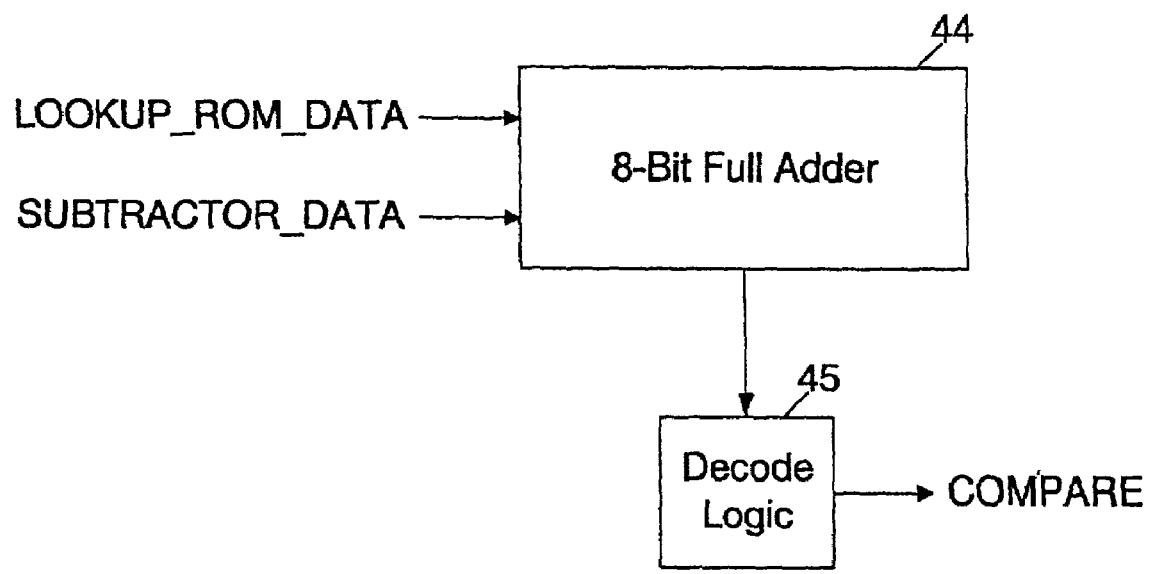
FIG. 21 is a detailed block diagram of a comparator.

The comparator 13 shown in FIG. 9 functions as a range comparator to allow a tolerance for the feature interval match process. A detailed block diagram of the comparator is shown in FIG. 21. The comparator 13 includes a full adder 44 with the one's compliment of an interval from the lookup ROM 14 as its input. The carry zero input of the adder is set to true. The output of the adder 44 is the value of the expected interval, subtracted from the measured interval. Decode logic 45 provides a true output signal COMPARE when the adder output has any of the values FE, FF, 00, 01, or 02, thus providing an indication of an exact match ("00"), plus or minus a tolerance of two counts, or 1.5625 $\mu$s. This tolerance is one half of the required correlation resolution, and may be set to any desired value.

The position subtractor 16 discussed above subtracts the measured position of the identified feature from the known position of this feature within the unshifted superchirp. The measured position of the identified feature within the input superchirp is stored as the elapsed time value in the feature start time latch 8. Only the eight most significant bits of this value need be used. Since the elapsed time counter 2 begins counting the elapsed time from a count of two, the eight most significant bits of the value stored in the feature start time latch 8 represent the start time, or position, of the identified feature, rounded to the nearest 3.125 $\mu$s interval. This value is provided in one's compliment form to an 8-bit adder with its carry zero input set to true. The output of the adder is the value of the measured start time of the identified feature, subtracted from the default start time for this feature, obtained from the lookup ROM 14 and stored in the default position latch 15. The 8-bit output of the position subtractor 16 represents the time shift value of the input superchirp, referenced to the unshifted superchirp pattern, within a resolution of 3.125 $\mu$s. This output value is valid regardless of whether the measured position value is greater than, less than, or equal to the default position value.

The various aspects of the invention have been described in connection with a number of exemplary embodiments. To facilitate an understanding of the invention, many aspects of the invention were described in terms of sequences of actions that may be performed by elements of a computer system. For example, it will be recognized that in each of the embodiments, the various actions could be performed by specialized circuits (e.g., discrete logic gates interconnected to perform a specialized function), by program instructions being executed by one or more processors, such as an application-specific integrated circuit (ASIC), or by a combination of both.

Moreover, the invention can additionally be considered to be embodied entirely within any form of computer readable storage medium having stored therein an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiment may be referred to herein as "logic configured to" perform a described action, or alternatively as "logic that" performs a described action.

Various embodiments of Applicant's invention have been described, but it will be appreciated by those of ordinary skill in this art that these embodiments are merely illustrative and that many other embodiments are possible. The intended scope of the invention is set forth by the following claims, rather than the preceding description, and all variations that fall within the scope of the claims are intended to be embraced therein.

What is claimed is:

1. A method of correlation, the method comprising the steps of:
   identifying a feature in an input data stream;
   storing a starting time associated with the identified feature relative to a boundary of the input data stream;
   measuring a time interval until the identified feature is next repeated in the input data stream;
   comparing the measured time interval to each of a set of valid interval values for the identified feature; and
   calculating a difference between the stored starting time and a starting time associated with the identified feature relative to a boundary of a reference data sequence when the measured time interval matches one of the valid interval values;
   wherein the calculated difference determines an amount that the input data stream must be time-shifted to achieve correlation with the reference data sequence.

2. The method of claim 1, wherein a feature is comprised of sequences of cycle periods included in the input data stream.

3. The method of claim 2, wherein the step of identifying a feature comprises the steps of:
   detecting positive or negative zero-crossings in the input data stream;
   measuring a first cycle period between consecutive positive or negative detected zero-crossings;
   comparing the first measured cycle period to each of a set of cycle periods associated with the input data stream;
   measuring a second cycle period between consecutive positive or negative detected zero-crossings immediately following the first cycle period and a third cycle period between consecutive positive or negative detected zero-crossings immediately following the second cycle period when the first measured cycle period matches one of the set of cycle periods associated with the input data stream; and
   comparing the first, second, and third cycle periods to a set of expected cycle period sequences associated with the input data stream;
   wherein a feature is identified when all periods match in sequence one of the set of expected cycle period sequences.

4. The method of claim 3, further comprising the step of:
quantizing the input data stream into two levels corresponding to respective positive and negative excursions of data in the stream before detecting positive or negative zero-crossings in the stream.

5. The method of claim 1, wherein the input data stream includes symbols of a specific length and each symbol is individually correlated to the reference data sequence.

6. The method of claim 5, wherein the boundary of the input data stream corresponds to the start of a symbol.

7. The method of claim 5, wherein each symbol period includes a time-shifted or rotated form of the reference data sequence.

8. The method of claim 7, wherein the reference data sequence is comprised of subsections.

9. The method of claim 8, wherein each subsection includes a time-shifted or rotated form of the reference data sequence.

10. The method of claim 8, wherein the identified feature and next repeated identified feature in the input data stream are located in respective adjacent subsections of the time-shifted or rotated reference data sequence that form each symbol period.

11. A method of correlation, the method comprising the steps of:
searching for transitions of cycle periods in an input data stream including a number of subsections to determine a transition time for each of the subsections;
identifying a feature in the input data stream;
storing a starting time associated with the identified feature;
calculating a first offset between the stored starting time and a nearest earlier determined transition time;
calculating a second offset between the nearest earlier determined transition time and a boundary of the input data stream;
comparing the calculated first offset with a set of valid offset values for the identified feature to identify the subsection in which the feature is located; and
subtracting the second offset from a known offset between a transition time for the identified subsection and a boundary of a reference data sequence;
wherein the result of the subtraction determines an amount that the input data stream must be time-shifted to achieve correlation with the reference data sequence.

12. The method of claim 11, wherein the step of searching for transitions of cycle periods comprises the steps of:
detecting positive or negative zero-crossings in the input data stream;
measuring a first cycle period between consecutive positive or negative detected zero-crossings;
measuring a second cycle period between consecutive positive or negative detected zero-crossings immediately following the first cycle period;
determining if the first cycle period and second cycle period span consecutive subsections;
measuring a third cycle period between consecutive positive or negative detected zero-crossings immediately preceding a next expected subsection transition time and measuring a fourth cycle period between consecutive positive or negative detected zero-crossings immediately following the third cycle period if the first cycle period and second cycle period span consecutive subsections;
determining if the third cycle period and fourth cycle period span the next expected subsection; and
determining the transition time for each of the subsections based upon the next expected subsection transition time if the third cycle period and fourth cycle period span the next expected subsection.

13. The method of claim 12, further comprising the step of:
quantizing the input data stream into two levels corresponding to respective positive and negative excursions of data in the stream before detecting positive or negative zero-crossings in the input data stream.

14. The method of claim 11, wherein the step of identifying a feature comprises the steps of:
detecting positive or negative zero-crossings in the input data stream;
measuring a first cycle period between consecutive positive or negative detected zero-crossings;
comparing the first measured cycle period to each of a set of cycle periods associated with the input data stream;
measuring a second cycle period between consecutive positive or negative detected zero-crossings immediately following the first cycle period, and a third cycle period between consecutive positive or negative detected zero-crossings immediately following the second cycle period when the first measured cycle period matches one of comparing the first, second, and third cycle periods to a set of expected cycle period sequences associated with the input data stream;
wherein a feature is identified when all periods match in sequence one of the set of expected cycle period sequences.

15. The method of claim 14, further comprising the step of:
quantizing the input data stream into two levels corresponding to respective positive and negative excursions of data in the stream before detecting positive or negative zero-crossings in the input data stream.

16. The method of claim 11, wherein the input data stream includes symbols of a specific length and each symbol is individually correlated to the reference data sequence.

17. The method of claim 16, wherein the boundary of the input data stream corresponds to the start of a symbol.

18. The method of claim 17, wherein each symbol period includes a time-shifted or rotated form of the reference data sequence.

19. The method of claim 11, wherein each subsection includes a time-shifted or rotated form of the reference data sequence.

20. A correlator, comprising:
a start feature state machine that identifies a feature in an input data stream and determines a start time relative to a boundary of the input data stream when the feature is identified;
an end feature state machine that determines an end time when the identified feature is next repeated in the input data stream;
an interval subtractor that subtracts the start time from the end time to define an interval for the identified feature;
memory including a set of stored valid interval values for the identified feature and a set of reference start times relative to a boundary of a reference data sequence, each reference time corresponding to a respective one of the stored valid interval times for the identified feature;
a feature interval state machine that validates the interval produced by the interval subtractor for the identified feature by comparing the interval with each of the valid interval values for the identified feature stored in the memory; and a position subtractor that calculates the difference between the start time relative to the boundary of the input data stream and a reference time corresponding to a valid interval value that matches the interval produced by the interval subtractor;

wherein the calculated difference determines an amount that the input data stream must be time-shifted to achieve correlation with the reference data sequence.

21. The correlator of claim 20, wherein a feature is comprised of sequences of cycle periods included in the input data stream.

22. The correlator of claim 21, further comprising:

a zero-crossing detector that detects positive or negative zero-crossings of a data in an input data stream; and a period detector that measures cycle periods between consecutive positive or negative detected zero-crossings.

23. The correlator of claim 22, further comprising:

logic that measures a first cycle period between consecutive positive or negative detected zero-crossings;

logic that compares the first measured cycle period to each of a set of cycle periods associated with the input data stream;

logic that measures a second cycle period between consecutive positive or negative detected zero-crossings immediately following the first cycle period and a third cycle period between consecutive positive or negative detected zero-crossings immediately following the second cycle period when the first measured cycle period matches one of the set of cycle periods associated with the input data stream; and logic that compares the first, second, and third cycle periods to a set of expected cycle period sequences associated with the input data stream;

wherein a feature is identified when all periods match in sequence one of the set of expected cycle period sequences.

24. The correlator of claim 23, wherein the zero-crossing detector comprises:

a comparator that quantizes the input data stream into two levels corresponding to respective positive and negative excursions of data in the stream before detecting positive or negative zero-crossings in the stream.

25. The correlator of claim 20, wherein the input data stream includes symbols of a specific length and each symbol is individually correlated to the reference data sequence.

26. The correlator of claim 25, wherein the boundary of the input data stream corresponds to the start of a symbol.

27. The correlator of claim 25, wherein each symbol period includes a time-shifted or rotated form of the reference data sequence.

28. The correlator of claim 27, wherein the reference data sequence is comprised of subsections.

29. The method of claim 28, wherein each subsection includes a time-shifted or rotated form of the reference data sequence.

30. The correlator of claim 28, wherein the identified feature and next repeated identified feature in the input data stream are located in respective adjacent subsections of the time-shifted or rotated reference data sequence that form each symbol period.

* * * * *